United States Patent [19]

Fushimi et al.

[11] Patent Number: 5,136,409

[45] Date of Patent: Aug. 4, 1992

[54] LIQUID CRYSTAL DEVICE HAVING AT LEAST TWO ZONES HAVING DIFFERENT DIFFUSION CHARACTERISTICS

[75] Inventors: Masahiro Fushimi; Kiyoshi Iizuka, both of Kanagawa, Japan

[73] Assignee: Canon Kabushiki Kaisha, Tokyo, Japan

[21] Appl. No.: 675,065

[22] Filed: Mar. 26, 1991

Related U.S. Application Data

[63] Continuation of Ser. No. 249,659, Sep. 27, 1988, abandoned.

[30] Foreign Application Priority Data

Sep. 29, 1987 [JP] Japan .................................. 62-242596
Jan. 19, 1988 [JP] Japan .................................... 63-7592
Apr. 18, 1988 [JP] Japan .................................. 63-95324

[51] Int. Cl.$^5$ .................................................. G02F 1/13
[52] U.S. Cl. .................................. 359/87; 259/69; 259/84; 259/94
[58] Field of Search ........... 350/333, 334, 336, 347 R, 350/347 V, 340, 341, 347 E, 346; 359/55, 67, 69, 84, 87, 94

[56] References Cited

U.S. PATENT DOCUMENTS

| | | | |
|---|---|---|---|
| 3,834,794 | 9/1974 | Sorey | 350/336 |
| 3,883,227 | 5/1975 | Kobayashi et al. | 350/336 |
| 3,981,559 | 9/1976 | Channin | 350/336 |
| 4,333,708 | 6/1982 | Boyd et al. | 350/346 |
| 4,645,304 | 2/1987 | Kawamura et al. | 350/336 |
| 4,804,251 | 2/1989 | Jacobs | 350/336 X |
| 4,836,657 | 6/1989 | Gunji et al. | 350/334 |

FOREIGN PATENT DOCUMENTS 58-23016 2/1983 Japan .................. 350/336

OTHER PUBLICATIONS

Sorey, "Field effects in nematic liquid crystals obtained with interdigital electrodes", Appl. Phys. vol. 45, No. 12, Dec. 1974, (pp. 5466–5468).

Aviram et al, "Surface Reorientation Liquid Crystals Display Device", IBM, vol. 15, No. 6, Nov. 1972.

*Primary Examiner*—Stanley D. Miller
*Assistant Examiner*—Huy K. Mai
*Attorney, Agent, or Firm*—Fitzpatrick, Cella, Harper & Scinto

[57] ABSTRACT

A liquid crystal element includes a liquid crystal having a molecular orientation varying according to an applied voltage, first upper and lower electrodes which are opposed in plane to each other and between which the liquid crystal is interposed, and second upper and lower electrodes which are not opposed in plane to each other and between which the liquid crystal is interposed. Phasic variations of the liquid crystal element are obtained by means of a first electric field which is impressed on the liquid crystal by applying a first voltage between the first upper and lower electrodes and a second electric filed which is generated by applying between the second upper and lower electrodes a second voltage which differs from the first voltage.

8 Claims, 27 Drawing Sheets

FIRST TRANSPARENT ELECTRODES

LIQUID CRYSTAL DEVICE HAVING AT LEAST TWO ZONES HAVING DIFFERENT DIFFUSION CHARACTERISTICS

This application is a continuation of application Ser. No. 07/249,659 filed Sep. 27, 1988, now abandoned.

BACKGROUND OF THE INVENTION

1. Field of the Invention

This invention relates to a liquid crystal element suited for a liquid crystal phase grating formed with a liquid crystal, or to a liquid crystal element or a device such as a focusing screen which uses a liquid crystal and is highly suitable for a photographic camera, a video camera, etc., and more particularly to a focusing screen arranged to give a desired diffusion characteristic by controlling an electric field applied to the liquid crystal in such a way as to change its configuration.

2. Description of the Related Art

Focusing screens of varied kinds using liquid crystals have been proposed They include a popularly known kind using scattering type liquid crystals by utilizing their so-called dynamic scattering mode resulting from their property of having local and temporal changes in refractive index when the liquid crystal molecules make random motions FIG. 24 of the accompanying drawings shows in outline the conventional scattering type liquid crystal cell. The illustration includes glass substrates 241a and 241b; and transparent electrodes 242a and 242b each of which is made of a thin film consisting of indium oxide and tin oxide These electrodes 242a and 242b are applied by vapor deposition to the inner sides of the glass substrates 241a and 241b. A liquid crystal layer 244 is formed by a frame body 243 which is interposed between these electrodes 242a and 242b. A voltage is arranged to be applied to the liquid crystal layer 244 by means of a drive source 245 and a switch 246 via the pair of transparent electrodes 242a and 242b. The voltage application enables the liquid crystal cell to act as a focusing screen by scattering the liquid crystals FIG. 25 shows the scattering state of the liquid crystals caused by the voltage application through changes occurred in the quantity of vertical transmission light when white light L is allowed to be vertically incident on the above stated liquid crystal cell.

As regards known methods for changing the diffusion characteristic of the focusing screen using a liquid crystal cell, Japanese Laid-Open Patent Application No. SHO 48-37379, for example, discloses a method of changing the whole focusing screen between a transparent state and a scattered state according to the presence or absence of an applied voltage. In another method which is disclosed in Japanese Laid-Open Patent Application No. SHO 50-115523, the diffusion characteristic is changed by adjusting the applied voltage. Generally, the scattering type liquid crystal cell is arranged to have a light scattering effect by utilizing the fact that a liquid crystal molecule group is brought into a turbulent state within the liquid crystal layer by a voltage applied thereto. The liquid crystal molecule group which gives the scattering effect measures about several μm to several hundred μm. When a focusing screen which consists of such liquid crystals is disposed at a part of the view finder of a camera and is arranged to be observed in a state of being magnified by several diameters, the turbulent state of the liquid crystal undesirably comes to show.

Further, there has been known a liquid crystal phase grating wherein a phase grating is formed with liquid crystals and the degree of phasic changes is controlled by voltages applied thereto. FIG. 26 shows in a sectional view the arrangement of the liquid crystal phase grating of this kind. As shown, a liquid crystal layer 264 is interposed between and carried jointly by a first transparent electrode 261 and second transparent electrodes 262 and 263.

Generally, the liquid crystal molecules give a refractive index "no" for light polarized in the direction of the major axis of the molecule and a refractive index "ne" for light polarized in the direction of the minor axis thereof. The liquid crystal molecule thus can be expressed as a spheroid having a major axis of "2ne" and a minor axis of "2no". FIG. 27 is a sectional view showing such a liquid crystal molecule.

Referring to FIG. 27, a reference numeral 270a denotes in a case where the applied voltage is zero. Another numeral 270b denotes it as in a state of having its major axis turned round toward an electric field by dielectric anisotropy. The turning degree is proportional to the intensity of the electric field applied. In the case of FIG. 27, the major axis is turned round to a degree of angle $\theta$. When an incident light comes in the direction of an axis z under this condition, this incident light can be considered to be split into a polarized light component in the y axial direction perpendicular to an axis x and a light component in the x axial direction. In the case where the light is natural light, these components are in equal quantities. As apparent from FIG. 27, the polarized light component in the y axial direction remains at the refractive index "no" irrespectively of the rotation of the liquid crystal molecule. Therefore, the polarized light component in the x axial direction is alone changed accordingly as the liquid crystal component rotates. Then, a refractive index "n$\theta$" is obtained as a value obtained at a point where it intersects the axis x. Therefore, assuming that the orthogonal projections of "n$\theta$" on axes x' and z' which are obtained with the axes x and z turned round to the degree $\theta$ are "x$\theta$" and "z$\theta$" respectively, since the section is elliptic, the refractive index "n$\theta$" can be expressed as follows:

$$\frac{x_e^2}{n_e^2} + \frac{z_e^2}{n_D^2} = 1$$

$$n\theta^2 = x\theta^2 + z\theta^2$$

$$\sin\theta = z_e/n_e$$

$$\therefore n\theta = \frac{ne}{\sqrt{1 + \left(\frac{ne^2}{no^2} - 1\right)\sin^2\theta}}$$

The refractive index "n$\theta$" thus changes from "ne" ($\theta=0$) to "no" ($\theta=90°$). FIG. 28 is a graph showing the refractive index in relation to the light polarized in the direction of the major axis of the liquid crystal molecule. The relation illustrated was obtained from the a nematic liquid crystal products ZLI-1694 (ne=1.633 and no=1.503) of Merck & Company, Ltd..

The refractive index of the part to which a voltage is applied can be changed, therefore, by applying the voltage to the liquid crystal layer in such a way as to turn round the liquid crystal molecules. In the case of FIG. 26, the liquid crystal molecules in the areas 265 and 266 are changed from their initial orientation to obtain a phasic change by applying voltages to the first transparent electrode 261 and the second transparent electrodes 262 and 263. Further, in the case of this figure, the degree of the phasic change is in relation to the turning degree of the liquid crystal molecules in a manner, for example, as shown in FIG. 28. However, the liquid crystal cell shown in FIG. 26 has presented the following problems: Although there arises no problem so long as the second transparent electrodes 262 and 263 are sufficiently spaced, an undesirable phasic change would arise also in the parts 267, 268 and 269 that should have no phasic change, if the electrodes 262 and 263 are spaced less than 500 $\mu$m or thereabout.

The cause for this problem is believed to be as follows: Generally the liquid crystals are dielectric, and have dielectric anisotropy, in which their dielectric constant differs in the direction of major axis and in the direction of the minor axis of the liquid crystal molecule. The arrangement to have such a dielectric matter interposed between two electrodes forms a capacitor. When a voltage is applied between the two electrodes in such a state, an electric field is generated not only between the two electrodes but it also leaks out from the end parts of the electrodes. The leaked electric field increases accordingly as the voltage applied between the electrodes increases and tends to turn round the liquid crystal molecules of parts other than necessary parts. As a result, a phasic change would arise to hinder the formation of a desired phase grating.

In view of this, there has been proposed a method for forming a minute phase grating by positively using the leak of the electric field. This method is effective particularly for a phase grating the period of which is less than about 500 $\mu$m. FIGS. 29(a) and 29(b) show the examples of the conventional arrangement made according to this method. A salient feature of these examples resides in that the second transparent electrodes 262 and 263 are formed to have a sufficiently small width relative to the cycle or period of their configuration. Meanwhile, the first electrode 261 either may be homogeneously formed over the whole surface as shown in FIG. 29(a) or may be arranged in the same manner as the second transparent electrodes 262 and 263 in the form of transparent electrodes 261a and 261b as shown in FIG. 29(b). In the case of FIG. 29(a), the electric field has leaked from the end faces of the second transparent electrodes 262 and 263 when a voltage was applied between the first transparent electrode 261 and the second transparent electrodes 262 and 263. FIG. 30 shows the leak electric field in terms of voltage.

In the case of FIG. 30, the second transparent electrodes 262 and 263 are arranged to measure 10 $\mu$m in width and are linearly arrayed at intervals of 100 $\mu$m. Voltages generated between the surfaces of the first and second electrodes 261, 262 and 263 when a rectangular wave of 1 KHz having 10 V in its peak-to-peak value is applied between the first transparent electrode 261 and the second transparent electrodes 262 and 263 are plotted by distances in the direction perpendicular to an electrode grating obtained at the second transparent electrodes.

Further, in this instance, the initial orientation is obtained by a rubbing treatment on an orientation film (not shown) which is formed on the transparent electrode and is homogeneously arranged in a direction orthogonally intersecting the second transparent electrodes 262 and 263. As for the liquid crystals, the nematic liquid crystal product ZLI-1694 of Merck & Company, Ltd. which is shown in FIG. 28 is employed. The refractive index distribution thus obtained is as shown in FIG. 31.

FIG. 32 shows in terms of voltage the leak of electric field which takes place from the end parts of the electrodes in the case of the arrangement shown in FIG. 29(b) using the same width and period of electrodes and the same liquid crystals as in FIG. 29(a). FIG. 33 shows in a graph the change of refractive index taking place in that instance. As apparent from comparison between FIGS. 31 and 33, the electric field leak is narrowed to permit formation of a finer liquid crystal phase grating by patternizing the shape of the first transparent electrode.

The leak quantity of the electric field varies with the dielectric constant as well as with the shape of the electrode. Therefore, the leak quantity can be lessened by using liquid crystals of a larger dielectric constant. Further, the use of the transparent electrodes may be replaced with the use of a metal material.

However, the conventional arrangement described above has presented the following problem: When a voltage is applied between two electrodes, the potential between the second electrodes 262 and 263 somewhat rises. Then, this limits the changing degree of the refractive index in some parts. In other words, the range of refractive index distribution is limited in accordance with the conventional arrangement.

Further, the diffusing degree distributable area within the focusing screen arranged according to the conventional arrangement depends on the pattern of the electrodes. Hence, it has been impossible to change the diffusing degree distribution area as desired according to the photo-taking conditions.

Further, in cases where the focusing screen is to be used for a single-lens reflex camera, the phase changing degree is considered to be sufficient if it is above 1.4 $\lambda$ for light having a wave length of 0.55 $\mu$m. For example, in case that a nematic liquid crystal material known by the trade name of RO-TN-2108 (made by Roche Co., ne=1.78, no=1.50) is arranged to measure 25 $\mu$m in liquid crystal layer thickness, the electrodes can be spaced more than 18 $\mu$m.

The minimum temperature required for the action of liquid crystals is about $-10°$ C. The liquid crystal becomes a mere liquid at a temperature lower than that. Whereas, the serviceable temperature range of a single-lens reflex camera is from $-20°$ to $+45°$ C. or thereabout. A liquid crystal cell which is capable of operating as liquid crystals within this temperature range has a double-refractive index difference (ne$-$no) is such a small value as about 0.1 unlike the value (ne$-$no$=$0.28) of the liquid crystal material RO-TN-2108 mentioned above. For use as a focusing screen, the liquid crystal cell must be arranged to have an increased thickness or to increase the period of the electrode grating.

However, an excessive increase in the liquid crystal cell thickness would cause a shallow depth of field to falsely appear as if it is deep because of the liquid crystal focusing screen. Therefore, the thickness of the cell cannot be much increased for the performance of the lens. Meanwhile, the arrangement to increase the spacing between electrodes results in a lowered degree of focusing accuracy. The spacing distance between them, therefore, must be set within a range from 15 to 40 $\mu$m or thereabout.

In view of the above stated limitations, there are no liquid crystals that are usable over the above stated operating temperature range in combination with simple grating electrodes. In other words, it is desirable to bring the maximum value of refractive index changes closer to the value of the double-refractive index difference (ne - no) possessed by the liquid crystal.

SUMMARY OF THE INVENTION

This invention is directed to the solution of the above stated problems of the prior art. It is therefore an object of the invention to provide a liquid crystal phase grating which is arranged to have the width of refractive index distribution, i.e. the degree of phasic changes, increased to a necessary degree by suppressing the rise of a potential between electrodes.

It is another object of the invention to provide a liquid crystal element or a device using the same, whereby, in forming a focusing screen by obtaining a diffusion characteristic, the focusing screen can be prepared in such a way as to always give a bright and adequate display highly suited for a photographic camera or a video camera without the fear of degradation of the quality of images to be observed due to a molecular turbulence of liquid crystals.

It is a further object of the invention to provide a liquid crystal element or a device using the same, whereby a focusing screen can be prepared by suitably setting the patternized shapes of opposite transparent electrodes in such a manner that: A difference obtained between maximum and minimum potentials when a voltage is applied to liquid crystals can be increased to broaden the range of refractive index changes; and a phase-type diffraction grating is formed by utilizing the leak of an electric field obtained within a non-electrode area to obtain thereby a predetermined diffusion characteristic.

It is a further object of the invention to provide a liquid crystal element, or a device using the same, whereby a focusing screen can be arranged to permit selection of a diffusing degree distribution thereof as desired according to photo-taking conditions.

A first feature of the invention resides in a liquid crystal element which comprises a liquid crystal having a molecular orientation varying according to an applied voltage; first upper and lower electrodes which are opposed in plane to each other and between which the liquid crystal is interposed; and second upper and lower electrodes which are not opposed in plane to each other and between which the liquid crystal is interposed. Phasic variations of the liquid crystal element are obtainable by means of a first electric field which is impressed on the liquid crystal by applying a first voltage between the first upper and lower electrodes and a second electric field which is generated by applying between the second upper and lower electrodes a second voltage which differs from the first voltage.

A second feature of the invention resides in a liquid crystal element, wherein: a field effect type liquid crystal which is arranged to have the direction of molecular configuration vary between a direction almost in parallel with two transparent substrates and a direction almost perpendicular to the substrates is interposed between the two transparent substrates via patternized transparent electrodes. The phasic variations are obtained by turning round liquid crystal molecules by an electric field generated in an area between the transparent electrodes when a voltage is applied to the electrodes. For obtaining a diffusion characteristic by attaining a periodic phase distribution in such a manner that no phasic change is brought about in a non-electrode area other than the area between the electrodes by an electric field leaking from the ends of the electrodes, the patternized transparent electrodes are formed by at least two independent areas to which different voltages are to be applied. The diffusion characteristic of the liquid crystal element is arranged to be variable by applying voltages from these electrodes.

A third feature of the invention resides in a liquid crystal device which comprises: a liquid crystal having a molecular orientation varying according to an applied voltage; a pair of electrodes between which the liquid crystal is interposed, one of the pair of electrodes being arranged in the form of a first electrode group which is set with a plurality of electrodes, another of the pair of electrodes being arranged in the form of a second electrode group which is set with a plurality of electrodes and is arranged to intersect the first electrode group; driving means for applying a voltage to the first and second electrode groups such that a phasic change is brought about in the liquid crystal jointly by a voltage applied between electrodes which are opposed in plane and a voltage applied between electrodes which are not opposed in plane; and designating means for designating an area of at least one of the first and second electrode groups such that at least two areas of different diffusion characteristics are obtained by the phasic change of the liquid crystal among display areas formed by a group of intersection parts formed jointly by the intersecting first and second electrode groups.

DETAILED DESCRIPTION OF THE PREFERRED EMBODIMENTS

The liquid crystal element according to this invention comprises a liquid crystal layer which changes the direction of its configuration between a direction which is almost parallel to a substrate surface and a direction which is almost perpendicular to the substrate surface according to the intensity of an electric field impressed thereon; and a pair of electrodes which are arranged to interpose and carry the liquid crystal layer between them. Phasic changes are brought about jointly by an electric field generated in a part of the liquid crystal layer between the electrodes by a voltage applied to the electrodes and an electric field leaking from the end part of the electrodes to another part of the liquid crystal layer which is located not between the electrodes. A liquid crystal phase grating is obtained with at least two different potentials (set on the basis of the ground potential) applied to both of or one of the pair of electrodes. Further, the surface of at least one of the pair of electrodes is formed into a grating-like shape. The grating-like electrode is either a transparent electrode or made of a metal material. The width of this electrode is preferably at least 2 μm and is less than 1/5 of the grating period.

In accordance with this invention, the amount of a voltage leak is suppressed by obtaining two different electrode potentials at least at one of the first and second electrode surfaces. The width of the refractive index distribution is broadened by increasing a difference in potential between maximum and minimum potential parts, so that the degree of phase variations can be increased.

For example, an electrode for adding another potential is formed on the surface on which patternized electrodes are to be formed. The leaking amount of voltage is suppressed by applying a voltage to (or by grounding) this other-potential adding electrode to let it have a desired potential. Compared with a case where there is provided no such other-potential adding electrode is formed, this arrangement increases differences in potential between opposed electrode planes and among different parts on the electrode plane.

Figure 1:
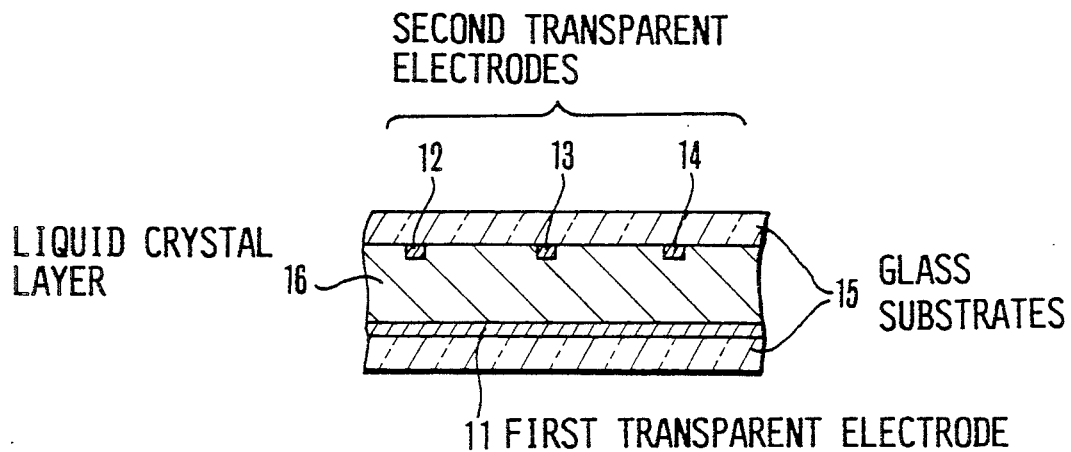
FIGS. 1 and 2 are sectional views showing an embodiment of this invention.
Figure 2:
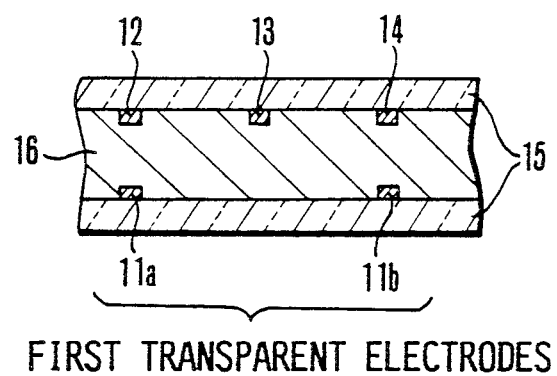

The details of embodiments of this invention are described with reference to the drawings as follows:

FIG. 1 is a sectional view of an embodiment of the invention. The embodiment comprises a first transparent electrode 11 and a group of second transparent electrodes 12, 13 and 14. These transparent electrodes are formed on a pair of glass substrates 15 in such a way as to have a liquid crystal layer 16 interposed between them. In the drawing, a reference numeral 13 denotes the above stated other-potential adding electrode. FIG. 2 is a sectional view of another embodiment. The embodiment has a group of second transparent electrodes 12, 13 and 14 arranged like in the case of FIG. 1. However, the first transparent electrode is arranged as a group of electrodes 11 a and 11(b which are opposed to the second transparent electrodes 12 and 14. In both cases of FIGS. 1 and 2, the other-potential adding electrode 13 is formed on the same electrode plane.

In these liquid crystal phase gratings utilizing a leaking electric field, the potential to be applied, a spacing distance between the first and second electrodes, the kind of the liquid crystals, a driving method (frequency, wave form, etc.) and operating temperature are important for obtaining a desired varying degree of refractive index. These parameters are not separately determined but are to be determined according to service conditions and an organic relation among them. Generally, however, the width of the electrodes which are formed in a grating-like shape is arranged to be less than 1/5 of the grating period. However, in the event of use of ITO (indium tin oxide), if the width of electrode lines is too thin, it becomes impossible to have uniform electric field distribution over the whole surface. In that event, therefore, the line width must be more than 2 μm. A potential to be applied to the electrode 13 must be different from a potential to be applied to the electrodes 12 and 14. A potential difference between the electrode 13 and the first electrode surface confronting it is preferably not exceeding ⅓ of a potential difference obtained between the first electrode surface and the electrodes 12 and 14.

Figure 3:
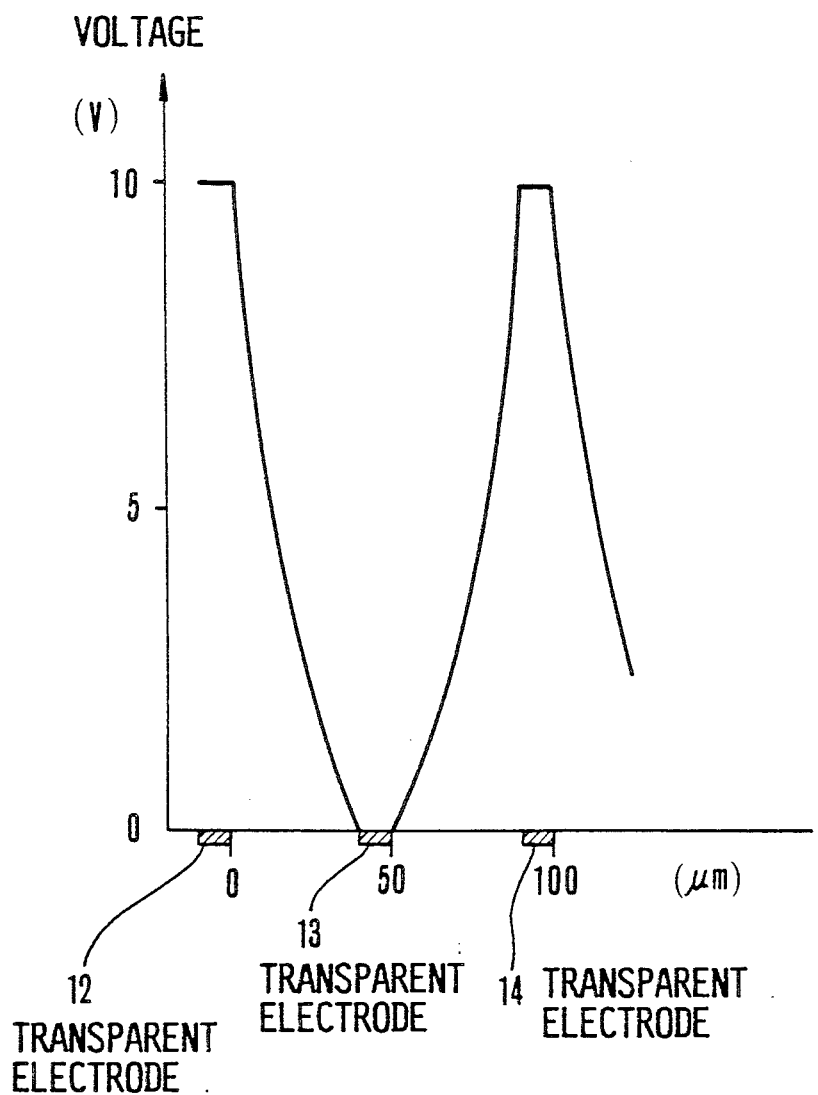
FIGS. 3 and 5 are graphs showing the voltage characteristics of the invention.

Referring to FIG. 1, the transparent electrodes 12, 13 and 14 respectively measures 10 μm and are linearly arranged at intervals of 50 μm. The electrode 13 and the first transparent electrode 11 are grounded. In FIG. 3, the potentials generated between the first and second electrodes when a rectangular wave of 1 KHz which is at 10 V in peak-to-peak value is applied to the electrodes 12 and 14 are plotted for distances between the electrodes 12 and 14. The initial orientation in this instance is obtained by a rubbing treatment on an orientation film (not shown but is formed on the transparent electrode) and are arranged in the direction of orthogonally intersecting the second transparent electrodes 12, 13 and 14 and approximately in parallel to the surface of the substrate.

Figure 4:
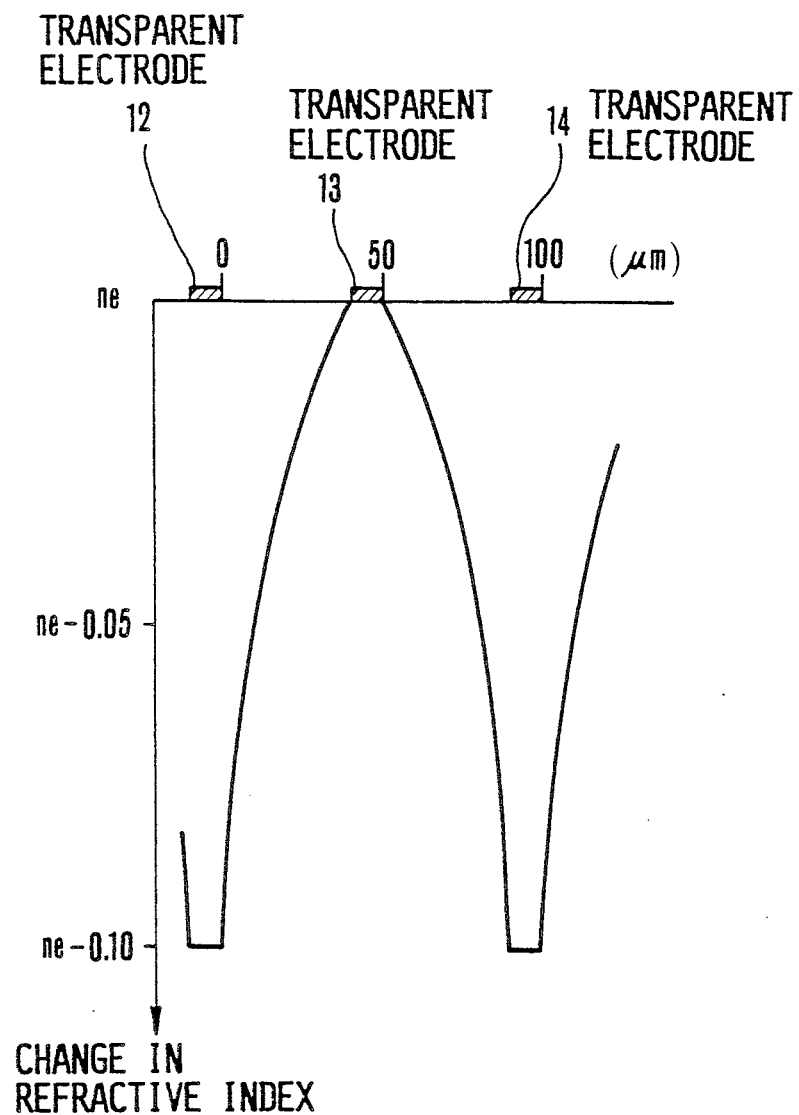
FIGS. 4 and 6 are graphs showing the distribution of refractive index obtained according to the invention.

As regards the liquid crystals, a nematic liquid crystal product of Merck & Company, Ltd. known by a trade name of ZLI-1694 was employed in an experiment. FIG. 4 shows the distribution of refractive index thus obtained.

In the case of FIG. 2, the first transparent electrode is formed as electrodes 11a and 11b in the same manner as the group of second transparent electrodes 12, 13 and 14. The amount of the leaking electric field is controlled by this electrode arrangement.

Figure 5:
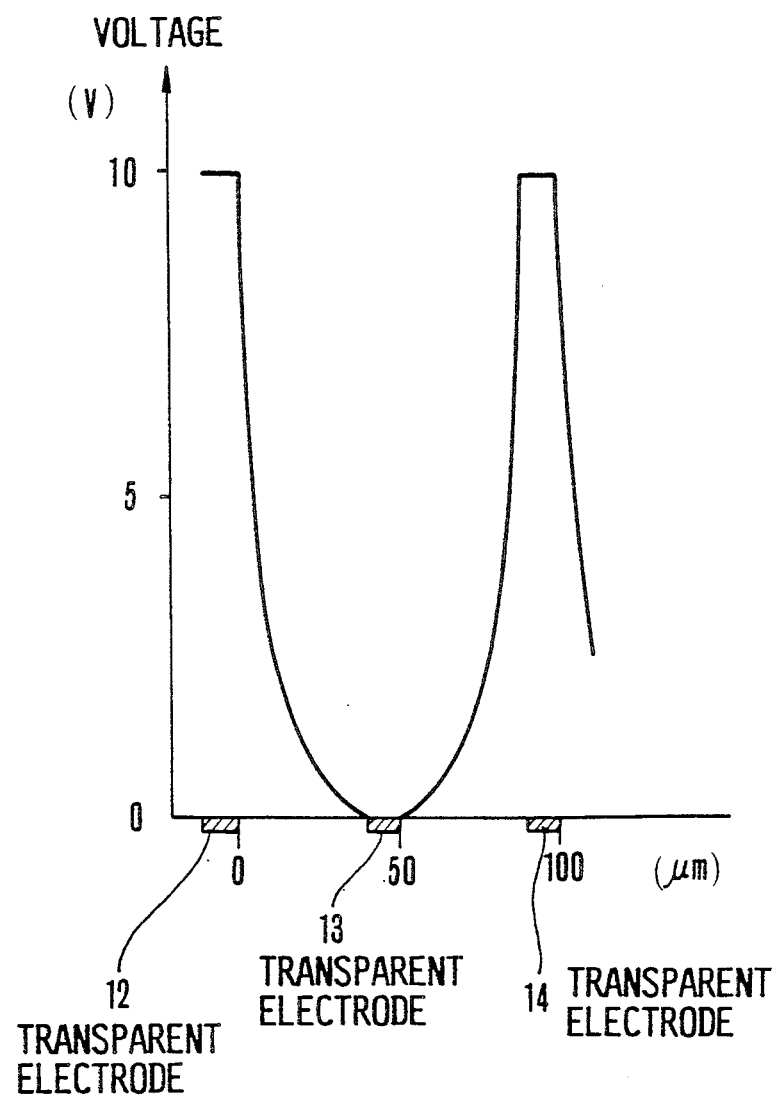
Figure 6:
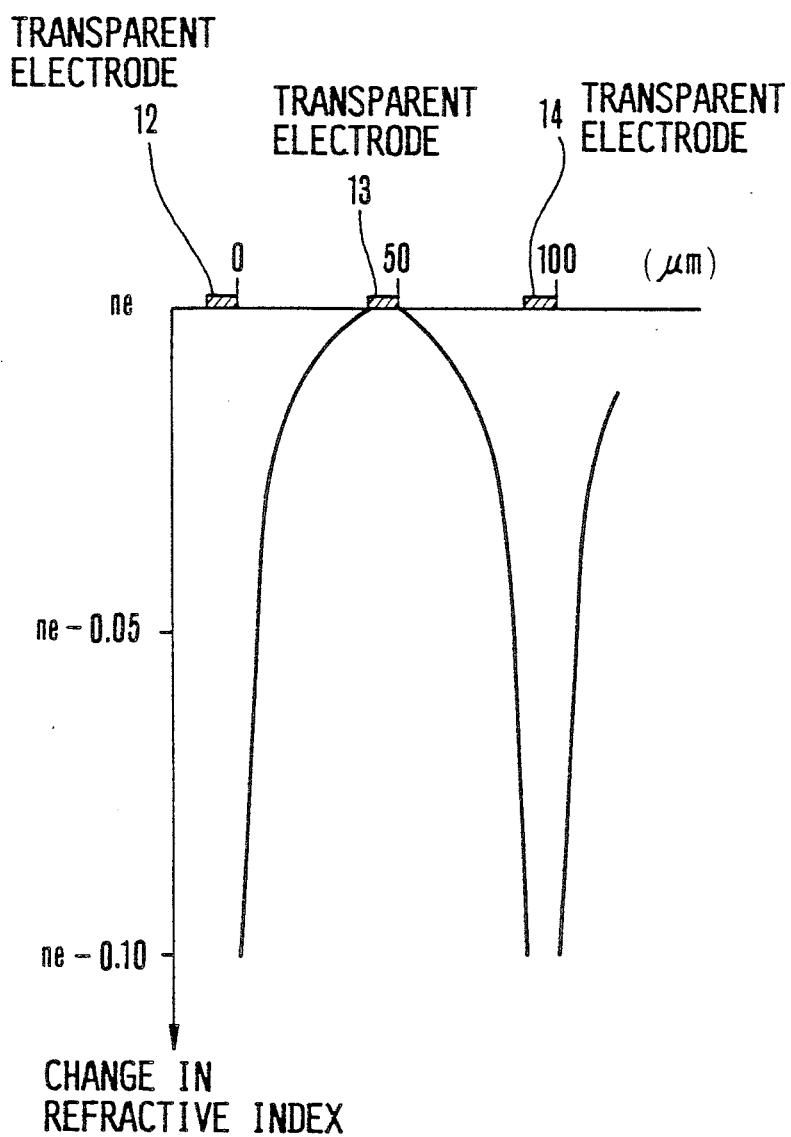

FIG. 5 shows in voltage the leaking electric field obtained from the end parts of electrodes with the liquid crystal element of the structural arrangement of FIG. 2 arranged to have the same width and period of electrodes and the same liquid crystals as in the case of FIG. 1. FIG. 6 shows changes of refractive index obtained in this instance. Further, results similar to these illustrations were obtained from experiments conducted by using a metal material for the electrodes.

Figure 7A:
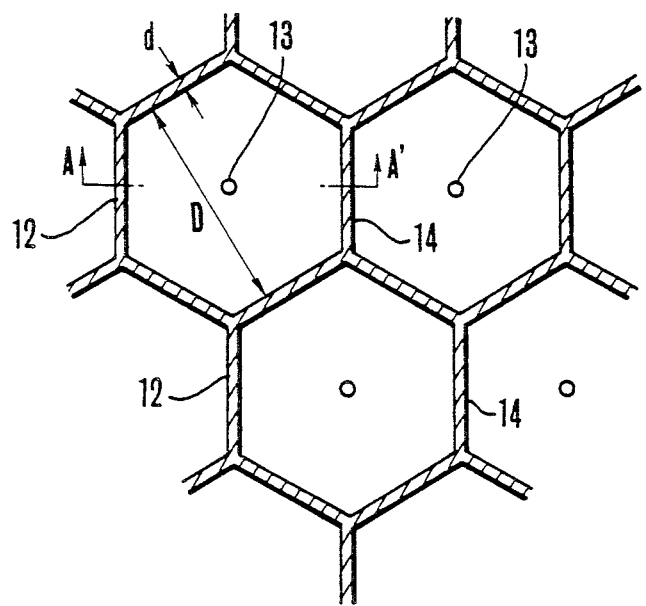
FIG. 7(a) is a plan view and FIG. 7(b) is a sectional view, both showing an application example of the invention.
Figure 7B:
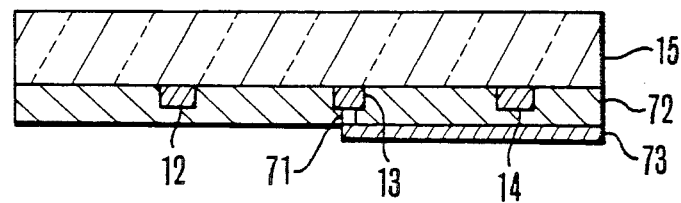

FIGS. 7(a) shows the second electrodes formed FIG. 7(b) is a sectional view taken on line A—A' of FIG. 7(a). The other-potential adding electrode 13 is prepared using an insulating film 72 which is provided with a through hole 71. In combination with the electrode 13, a leader electrode 73 is arranged with some conductive layer formed by a transparent electrode material or a metal material within the through hole 71. Each side width d of the hexagonal pattern poles which is thus obtained measures 10 μm. A distance D between electrodes confronting each other within each hexagonal plane measures 100 μm. The other-potential adding electrode 13 is in a circular shape measuring 5 μm in radius. Meanwhile, the first electrode is arranged to be an electrode which is homogeneous all over the whole surface thereof.

Experiments were conducted by applying a potential to the above stated cell under the same conditions as in driving the cell shown in FIG. 1. A difference in refractive index thus obtained between one part and another of the cell was compared with that of another cell which was prepared without providing the other-potential adding electrode. The result of comparison indicated that the provision of the other-potential adding electrode 13 enabled the cell to have a greater degree of changes in the same manner as in the case of the liquid crystal elements (or cells) described in the foregoing.

It has been thus ascertained that the invented arrangement has an advantageous effect also on a liquid crystal phase grating of an electrode pattern which is two-dimensional and has its periodicity vary with directions. As apparent from the examples described in the foregoing, the liquid crystal phase grating according to this invention permits increasing the width of refractive index distribution, i.e. the degree of phasic change, as much as possible by suppressing the rise of the potential between electrodes.

Figure 8:
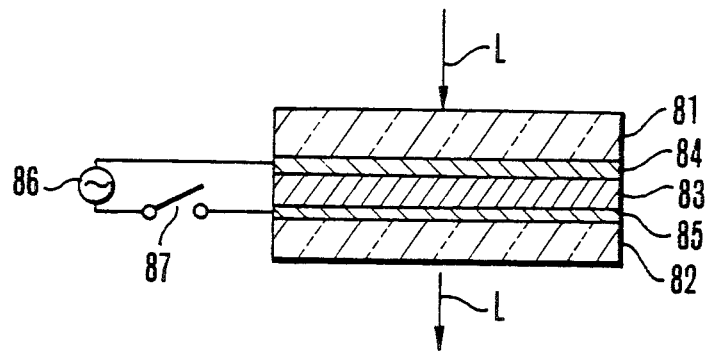
FIG. 8 is a sectional view showing in outline another embodiment of the invention.

FIG. 8 shows in outline a focusing screen which is arranged as an embodiment of the invention. The illustration includes transparent substrates 81 and 82; a field effect type liquid crystal 83; first and second transparent electrodes 84 and 85 which are formed in two discrete areas and patternized into given shapes as will be described later; a drive source 86; and a switch 87.

Figure 9:
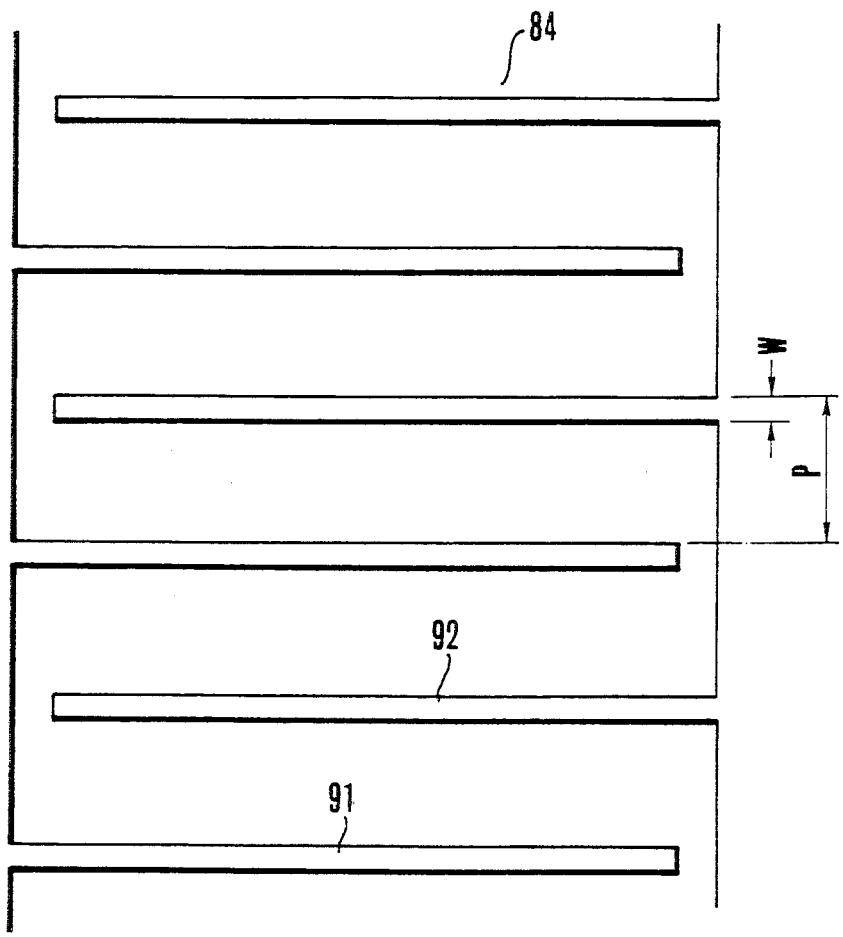
FIGS. 9 and 10 are illustrations of transparent electrode patterns obtained according to the invention.

FIG. 9 is an enlarged view showing a part of the patternized electrode of the first transparent electrode 84. In the case of this embodiment, the first transparent electrode 84 consists of two comb-shaped discrete grating parts 91 and 92. Two different potentials are arranged to be applied to these grating parts 91 and 92. The electrode width W of each of the grating parts 91 and 92 is set, for example, at 3 μm and the period P of them at 20 μm.

Figure 10:
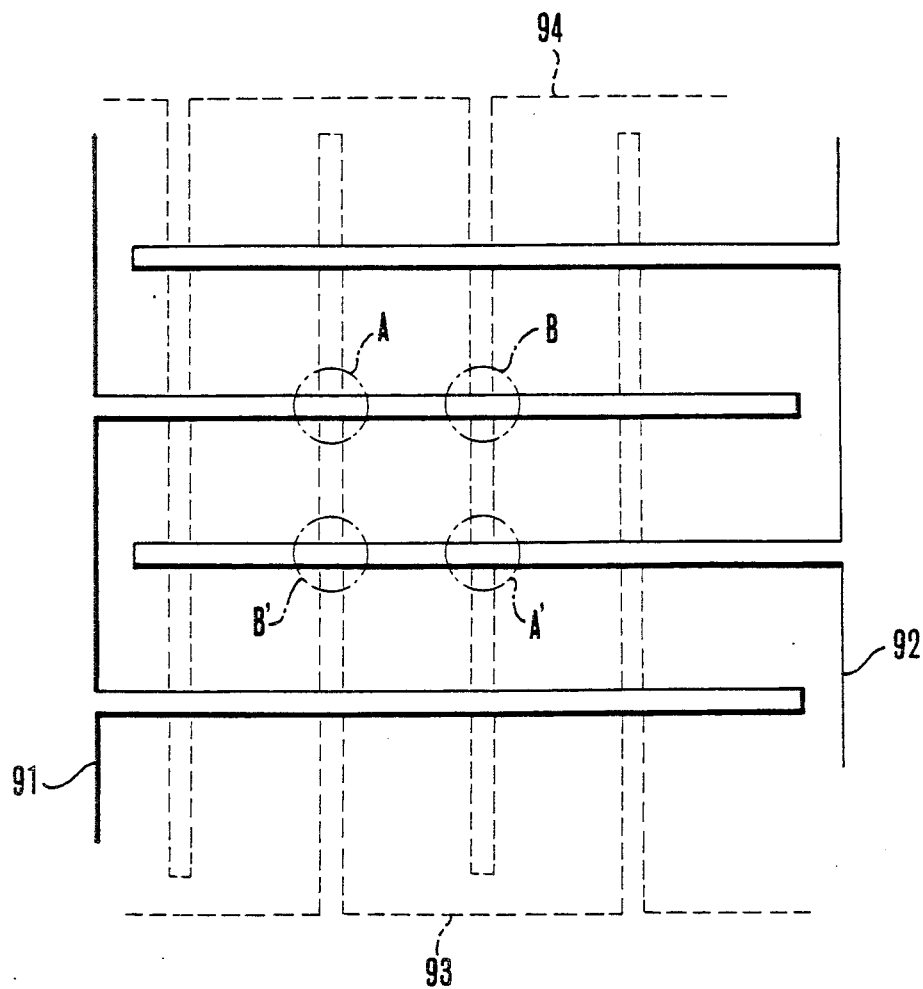

As shown in FIG. 10, in the case of this embodiment, the two transparent electrodes 84 and 85 are opposed to each other in such a way as to have a pair of grating parts 91 and 92 and another pair of grating parts 93 and 94 almost perpendicularly intersect each other. Two voltages of rectangular wave form of 1 KHz and of values of 10 V p-p (peak-to-peak) and 0 V are applied to the grating parts 91 and 92 respectively. Other grating parts 93 and 94 also have two rectangular wave form voltages of 10 V p-p and 0 V likewise applied thereto.

In this instance, as shown in FIG. 10, at the area A where the grating parts 91 and 93 intersect each other has potential difference of 0 V as the potentials of 10 V p-p of these parts 91 and 93 are applied thereto.

Likewise, at the area A', the potential difference between the grating parts 92 and 94 becomes 0 V as the voltages of 0 V are applied from the grating parts 92 and 94 respectively.

Meanwhile, at another area B where the grating parts 91 and 94 intersect each other has a potential difference of 10 V p-p as the potential of the grating part 91 is 10 V p-p while that of the grating part 94 is 0 V. The potential difference of 10 V p-p between the grating parts 92 and 93 is likewise obtained at an area B' where the grating parts 92 and 93 intersect each other.

In the case of this embodiment, the focusing screen comprising a liquid crystal cell is obtained by forming two opposed orientation films on electrodes in such a way as to have the liquid crystal layer interposed between them. The potential difference between the electrodes on two sides of the liquid crystal layer is arranged to be forcedly lowered, not merely by a leak potential, to increase the width or range of the refractive index changes of the liquid crystals, i.e. the width of phasic changes. The arrangement thus enables the phasic variations of the liquid crystals to be efficiently brought about to obtain a desired diffusion characteristic.

Figure 11:
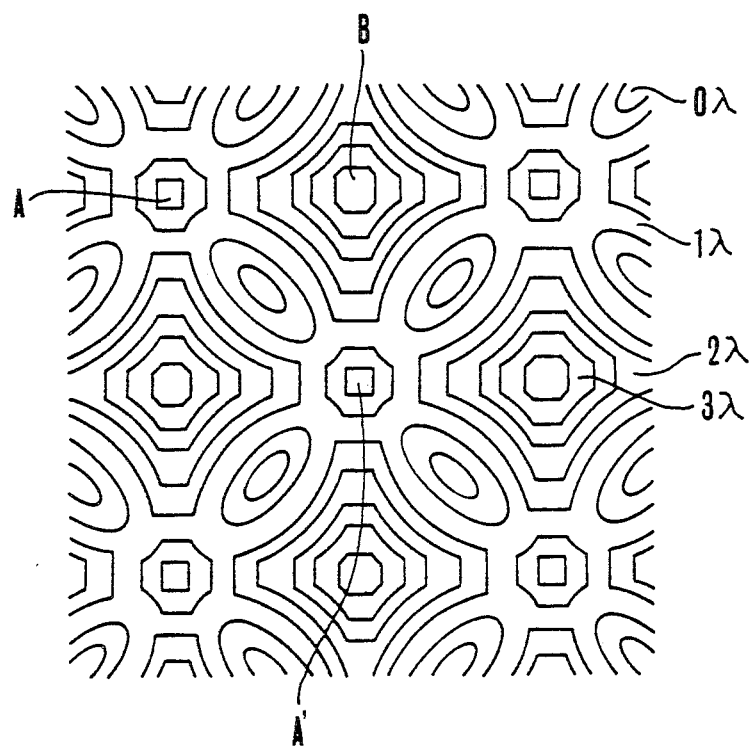
FIG. 11 shows phase distribution obtained on a focusing screen according to the invention.

FIG. 11 shows refractive index distribution obtained with the focusing screen of the invention arranged to have the thickness of the liquid crystal layer set at 30 μm, with the transparent electrodes arranged to be patternized in the manner as shown in FIG. 9 and by applying voltages to the electrodes. In FIG. 11, the distribution of phasic variations for light of wave length $\lambda = 0.55$ μm is obtained with the positions of the areas A and A' used as datum points. Further, in obtaining this, a nematic liquid crystal product of Roche no = 1.50, was employed. In the case of this embodiment, the refractive index change $\Delta n$ obtained between the areas A and B was about 0.06. Further, according to the results of experiments, a maximum phasic change obtained with the thickness of the liquid crystal layer set at 20 μm was about 2 $\lambda$, thus indicating a sufficient phasic change for a focusing screen.

Figure 12:
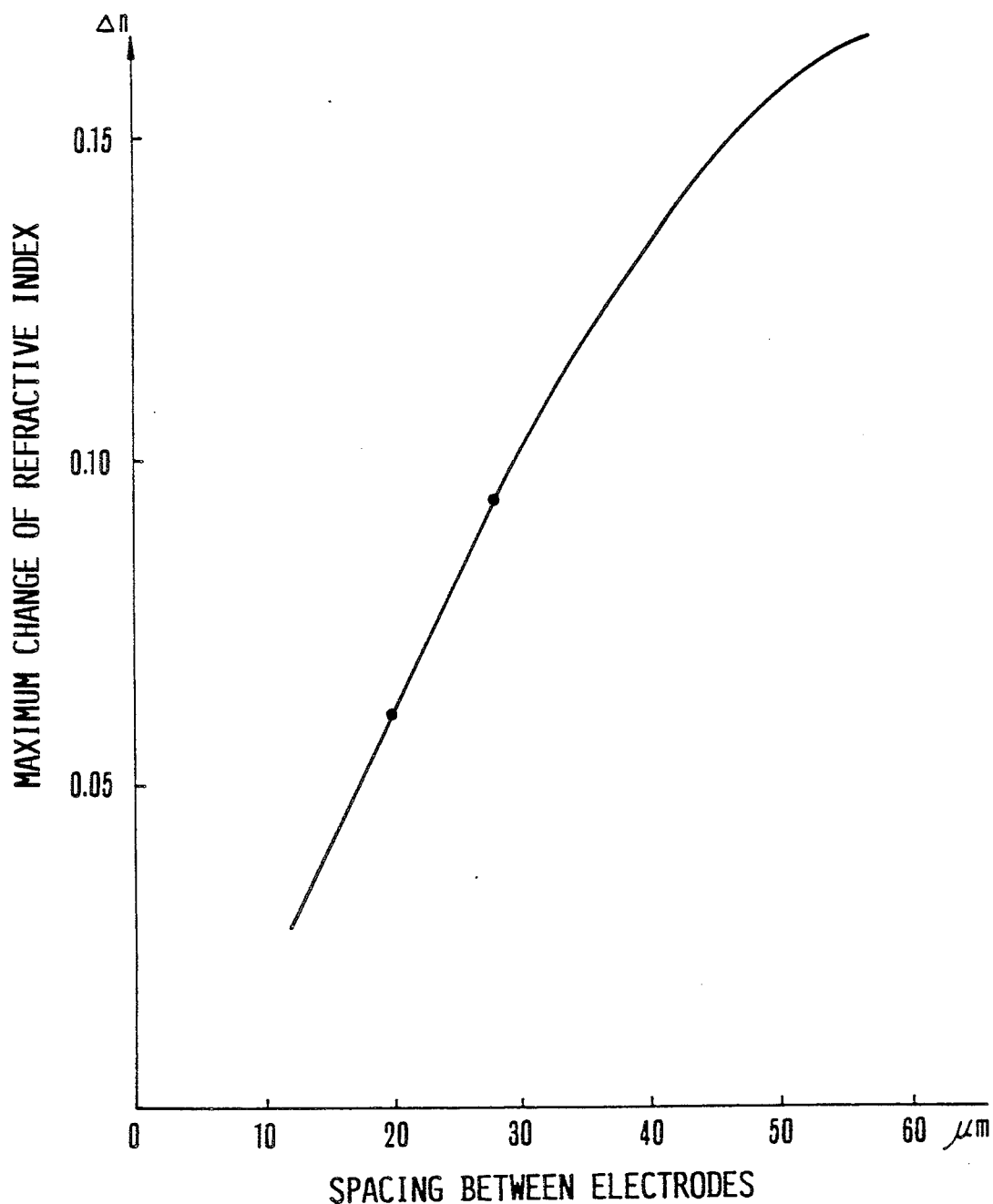
FIG. 12 shows changes in refractive index in relation to the electrode spacing of a liquid crystal cell arranged according to the invention.

FIG. 12 shows the maximum values of refractive index changes obtained by applying voltages to the transparent electrodes patternized as shown in FIG. 10 and by varying the spacing distance between the electrodes. The maximum values of refractive index changes are indicated in relation to the distances between electrodes.

Compared with the liquid crystal cell having transparent electrodes arranged in the conventional two-dimensional grating-like shape, the embodiment gives greater changes in refractive index. For example, the degree of the change is 1.7 times as much as the conventional cell with the electrode grating period of the cell set at 20 μm. This permits the use of liquid crystal having a small double-refractive index difference. The arrangement of this embodiment, therefore, broadens the range of selectable liquid crystal materials.

Cameras are generally used under the ambient temperature range from −20° to +45 degrees C. The required refractive index difference of a liquid crystal material is about 0.13. In accordance with the arrangement of this embodiment, a phasic difference of 1.4 $\lambda(\lambda = 0.55$ μm) is easily obtainable even with the thickness of the liquid crystal layer arranged to be within the range of 30 μm which is required for application to a focusing screen.

Further, the refractive index distribution obtained on the surface of the transparent electrodes differs from the distribution obtained between the electrodes. Therefore, undesirable diffraction light would result from this. To avoid such inconvenience, the width of the electrode lines must be arranged to be as small as possible relative to the period (or cycle) thereof. For that purpose, the electrode width is preferably less than 1/5 of the period. In other words, a pattern is formed in such a way as to have electrode areas which give recurrent or periodic phase distribution are preferably arranged to be smaller than non-electrode areas.

In cases where ITO is employed as the transparent electrode, an excessively great resistance would result from excessively thin width of the electrode line. In that event, it becomes difficult to obtain desired electric field distribution all over the focusing screen. As a result, it becomes difficult to obtain a desired state of refractive index distribution. In view of this, the line width ratio of the transparent electrode is preferably set at a value not less than 2 μm.

Figure 13:
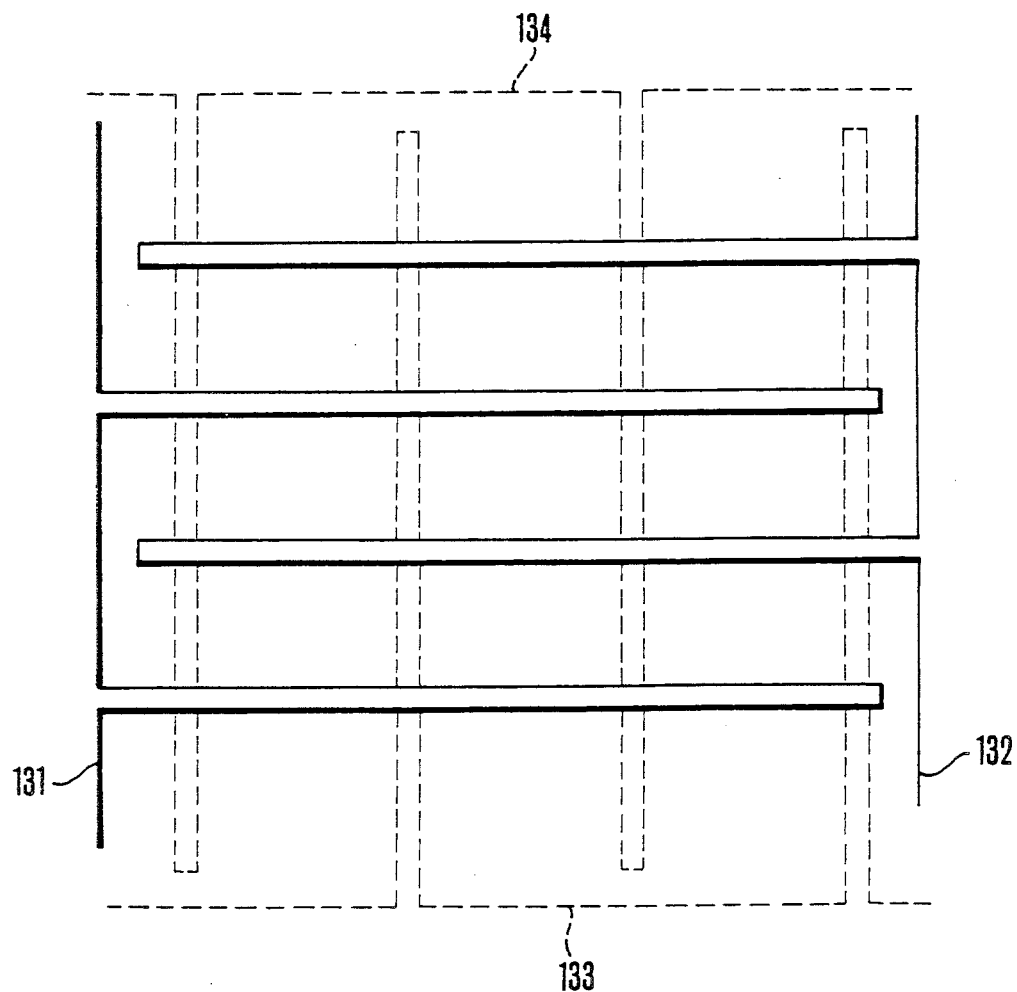
FIG. 13 shows a transparent electrode pattern obtained by a further embodiment of the invention.

FIG. 13 shows a pattern of the transparent electrodes of a focusing screen arranged as a further embodiment of the invention. In the case of the embodiment, the period of the grating parts 131 and 132 formed at one of the transparent electrodes differs from that of the grating parts 133 and 134 which are formed on the other transparent substrate surface in such a way as to almost orthogonally intersect the grating parts 131 and 132. This arrangement enables the focusing screen to have different degrees of focusing accuracy in the vertical direction and in the lateral direction.

In the embodiment described, the transparent electrodes are patternized into a comb-like shapes to which at least two different voltages are arranged to be separately applied. The comb-like patterns are arranged to orthogonally intersect each other across the liquid crystal layer. This arrangement increases the potential difference between the maximum and minimum potentials and thus facilitates formation of a two-dimensional phase grating which gives a larger degree of changes in the refractive index. Further, the arrangement broadens a serviceable ambient temperature range, prevents degradation of display quality due to the turbulence of the liquid crystal molecules and thus gives a focusing screen which has a given diffusion characteristic to ensure an adequate display.

In a preferred embodiment of this invention, the invention is applied to a focusing screen of the kind having a liquid crystal cell, wherein refractive index distribution is obtained by utilizing a leaking electric field resulting from voltage application to control the degree of diffusion. The embodiment is provided with leader parts of electrodes which are obtained by dividing the leader part of the group of electrodes; and selecting means for selecting the electrode to which a voltage is to be applied. The focusing screen is preferably provided with some electrode driving means that is arranged to impart a diffusing degree only to desired areas of the focusing screen.

With respect to the electrode driving means, it is preferable to obtain the distribution of a desired diffusing degree by applying at least two different potentials for different areas or by arranging at least two different electrode pattern periods to be selectable.

Further, with regards the electrodes, the transparent electrodes on the two substrates are formed in a line-like shape respectively; or the line-like electrodes are arranged almost perpendicularly to the upper and lower surfaces. Further, the electrodes to which at least two different potentials are to be applied may be periodically selected in obtaining an area having a specific diffusing degree. Further, of the above stated two or more different potentials, at least one of them is preferably arranged to be zero potential.

Conductive anisotropic rubber materials of different conducting periods may be used for electrically connecting a driving circuit to the electrodes. Then, the focusing screen may be provided with change-over means for selecting one of the rubber materials.

The arrangement described above enables the liquid crystal focusing screen to vary the diffusing degree distribution as desired according to photo-taking conditions with the voltage applying electrodes selected by selecting means. Further, the diffusing degree distribution can be accurately obtained as desired either by applying at least two different potentials which vary according to the applying areas or by driving the electrodes in such a way as to have at least two different electrode pattern periods are selected. Or, an area having a specific diffusing degree is obtainable by selecting the electrodes to which at least two different potentials are to be applied with periodicity imparted to them. The focusing screen arranged in this manner facilitates picture composition and focusing through a view finder.

Further, the diffusing degree distribution can be easily controlled with the transparent electrodes formed in a line-like shape on two substrates and with conductive anisotropic rubber members having different conducting periods arranged to be selectable for electric connection to the driving circuit.

The following describes an embodiment of the invention with reference to FIGS. 14 to 18'

Figure 14:
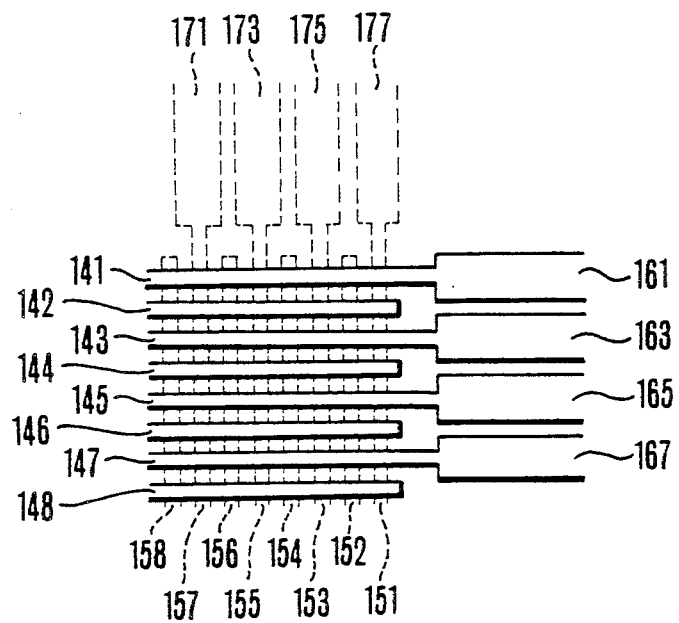
FIG. 14 is a plan view showing the essential parts of the electrode pattern of a liquid crystal focusing screen arranged according to the invention.

FIG. 14 shows a part of the electrode pattern of a liquid crystal focusing screen. The illustration includes a first group of line-shaped electrodes 141, 142, 143, 144, 145, 146, 147 and 148 and a second group of line-shaped electrodes 151, 152, 153, 154, 155, 156, 157 and 158. The first group of electrodes 141 to 148 are provided with leader parts 161, 163, 165 and 167. The second group of electrodes 151 to 158 are provided with leader parts 171, 173, 175 and 177.

Among the first and second groups of electrodes, the electrodes denoted by even-number reference numerals are grounding electrodes provided for zero potential while those denoted by odd-number reference numerals are voltage applying electrodes. The width of the electrodes and spacing distance between them are 5 μm. The width of the leader electrode parts is 15 μm. A focusing screen was prepared in accordance with the arrangement of this embodiment. For this, a nematic liquid crystal product of Roche Co. known by a trade name of RO-TN-2108 was employed. With an orientation film subjected to a rubbing treatment, the liquid crystal molecules are oriented at an angle of 45 degrees to each of the line-shaped electrodes and in parallel to the substrates. Further, the thickness of the liquid crystal layer was 20 μm.

Figure 15:
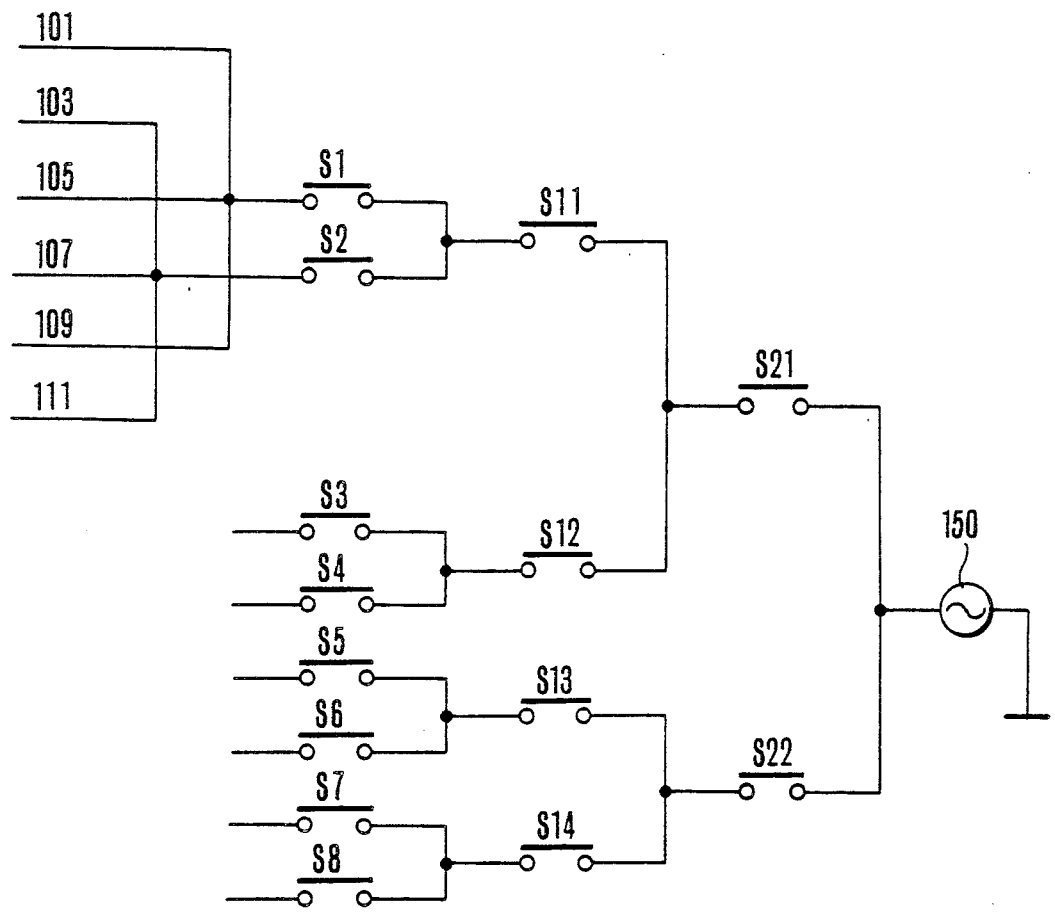
FIG. 15 is a circuit diagram showing in part a driving circuit of the focusing screen.

FIG. 15 shows a part of a drive circuit arranged to drive the above stated electrode pattern. The illustration includes leader parts 101, 103, 105, 107, 109 and 111 extending from the drive circuit; switches S1, S2, S3, S4, S5, S6, S7, S8, S11, S12, S13, S14, S21 and S22; and a power supply circuit 150. The switch S21 is provided for connecting the upper halves of the voltage-applying electrodes 141 to 148 and the switch S22 for connecting the lower halves of them. The switches S11 to S14 are provided for selection of further halves of the half areas of the electrodes. The switches S1 to S8 are provided for connecting every other electrode leader part within the four divided areas obtained through the switches S11 to S14. More specifically, the switch S1 is connected to the leader parts 101, 105 and 109. The switch S2 is connected to the leader parts 103, 107 and 111.

Switches similar to the above stated ones are also provided in circuits connected to the grounding electrodes of the first group of electrodes 141 to 148, the voltage applying and grounding electrodes of the second group of electrodes 151 to 158.

Figure 16:
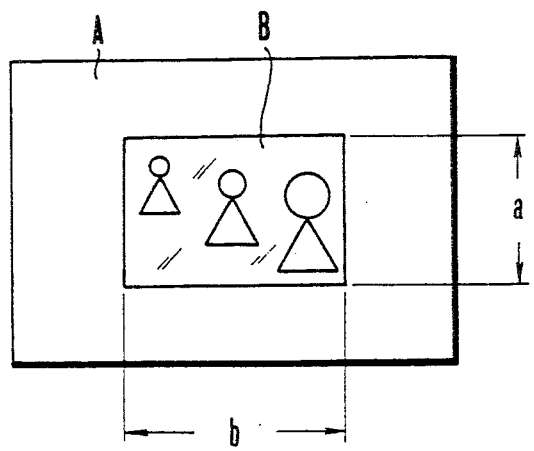
FIGS. 16, 17 and 18 show images obtained on the view finder of a camera respectively.
Figure 17:
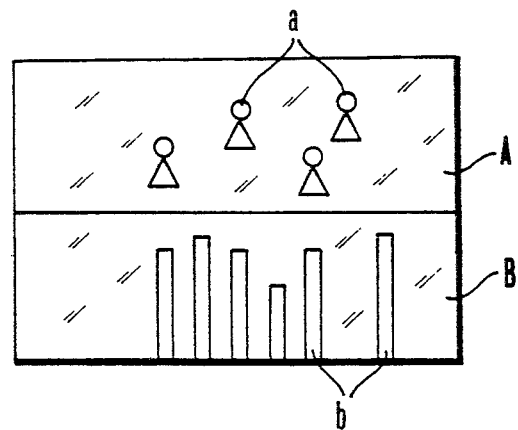
Figure 18:
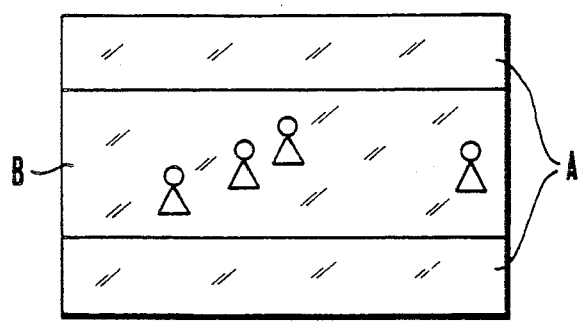

FIGS. 16, 17 and 18 schematically show images appeared on the view finder of a single-lens reflex camera to which the embodiment is applied. Of these drawings, FIG. 16 shows a case where the diffusing effect of the focusing screen is obtained only in the middle part which mainly has objects to be photographed. In this case, the switches shown in FIG. 15 is operated in such a way as to apply voltages to or ground only those of the first group of electrodes 141 to 148 located in a part "a" (see FIG. 16) and these of the second group of electrodes 151 to 158 located in a part "b" while all other electrodes are left in a state of not electrically connected. In this instance, no electric field is applied in the vertical direction to the part of the liquid crystal layer located within an area A (see FIG. 16). Therefore, this part is left almost completely transparent. Whereas, in another area B, a diffusing degree is obtained in relation to the voltage applied. In an experiment, a voltage which is 10 V (p-p value) and in a rectangular wave form of 1 KHz is applied between the voltage applying and grounding electrodes of the first group of electrodes 141 to 148 and those of the second group of electrodes 151 to 158. As a result, a refractive index changing degree of 0.03 was obtained to show an adequately diffused state.

The arrangement to have the peripheral part in a transparent state not only facilitates observation of the part unnecessary for focusing to help seize a shutter chance but also prevents the light quantity of parts around the view finder from decreasing. This effect is advantageous particularly for a lens of a large F-number. Further, it is possible to lower the diffusing degree by increasing the electrode period to be selected.

FIG. 17 shows a case where the electrode period to be selected for an area A is changed for another area B to obtain different diffusing states for these areas. Referring to FIG. 17, objects "a" are located in a rear part while objects "b" are located in a front part. In this case, all the electrodes of the second group of electrodes 151 to 158 are in a selected state. Further, among the first group of electrodes 141 to 148, all the electrodes located within the area A are in a selected state while every other electrode is in a state of being selected among those located within the area B. The area A is in an isotropic diffused state. The area B is in a state of having the diffusing degree suppressed in the longitudinal direction of an image plane.

When the lens is focused on the rear object "a" under this condition, the blurring degree of the image of the front object "b" can be lessened to facilitate observation of the images appearing in the view finder. Besides, in confirming a depth of field obtained by stopping down the aperture of the lens, the focused state of the front object "b" also can be confirmed by virtue of the degree of diffusion taking place in the lateral direction.

Further, the diffusing degree distribution can be more accurately controlled by forming at least two different potentials. FIG. 18 shows by way of example images obtained in the view finder with the focusing screen arranged in that manner. In that instance, all the electrodes of both the first and second groups of electrodes 141 to 148 and 151 to 158 are selected. A voltage of 6 V (p-p value) is applied to the voltage-applying electrodes which are located within areas A among the first group of electrodes 141 to 148. A voltage of 10 V (p-p value) is applied to the voltage-applying electrodes which are located within an area B among the first group of electrodes 141 to 148 and also to those of the second group of electrodes 151 to 158 located within the area B. Both the voltages are applied in a rectangular wave form of 1 KHz. Meanwhile, all the grounding electrodes of both the first and second groups of electrodes 141 to 148 and 151 to 158 are grounded.

Results of an experiment conducted in this manner showed diffusing degree distribution having a high degree of diffusion within the area B and a low degree of diffusion within the areas A. Further, in another experiment, the voltage applied to the areas A was continuously changed between 3 and 12 V. Then, the diffusing degree of the areas A continuously changed accordingly as the applied voltage was changed.

Figure 19:
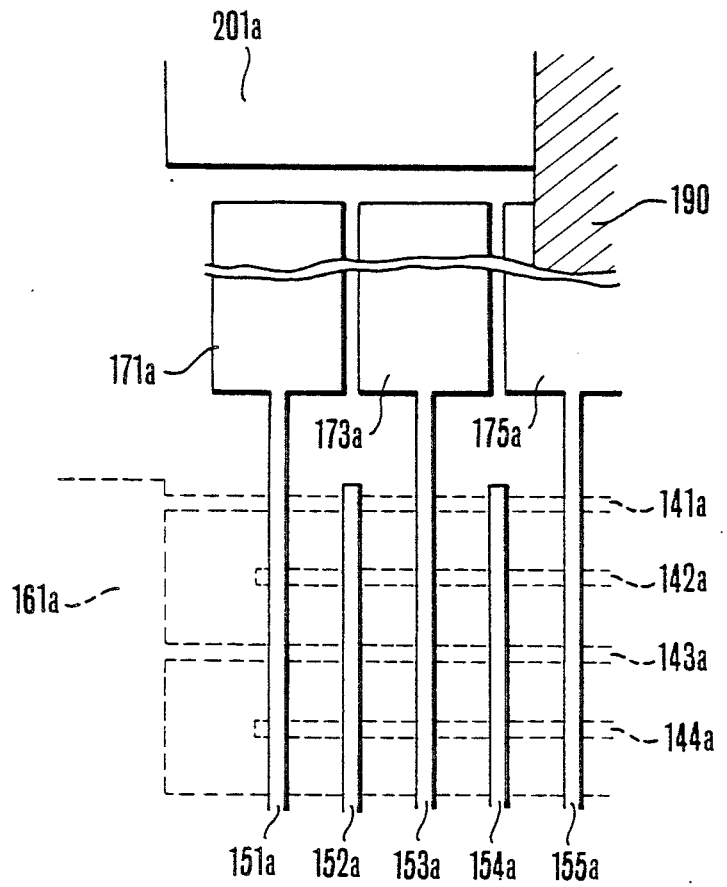
FIG. 19 is a plan view showing the essential parts of the electrode pattern of another liquid crystal focusing screen arranged according to the invention.
Figure 20:
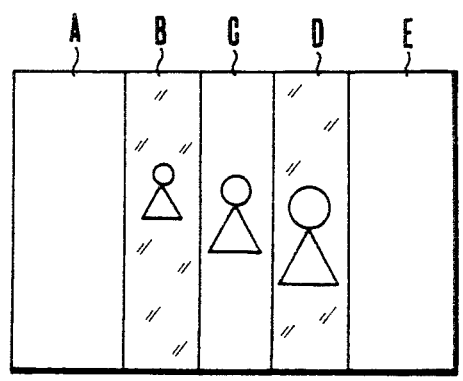
FIG. 20 shows an image appearing on the view finder of the camera.

FIGS. 19 and 20 show another embodiment of the invention. Referring to FIG. 19 which shows a part of an electrode pattern, the illustration includes a first group of electrodes 141a, 142a, 143a and 144a; a second group of electrodes 151a, 152a, 153a, 154a and 155a; a leader part 161a which is provided for the first group of electrodes 141a to 144a; leader parts 171a, 173a and 175a which are provided for the second group of electrodes 151a to 155a; and a leader part 201a which is arranged to extend from a driving circuit.

Among the first and second groups of electrodes. electrodes denoted by even numbers are grounding electrodes for zero potential. Those denoted by odd numbers are voltage applying electrodes. In an example of this arrangement, the width of electrodes was set at 3 μm. The spacing distance between electrodes was set at 12 μm. The width of the leader electrode parts was set at 25 μm. A nematic liquid crystal product of Roche Co. known by a trade name of RO-TN-2108 was employed as a liquid crystal material. The liquid crystal was oriented by a rubbing treatment performed on an orientation film in a direction which is at an angle of 45 degrees to each of the line-shaped electrodes and is parallel to the substrates. The thickness of the liquid crystal layer was 20 μm. Further, for the second group of electrodes 151a to 155a, there was provided a slide type contact part 190 which was arranged to partially connect the leader parts 171a, 173a and 175a to the leader part 201a of the driving circuit. The contact part 190 was interlocked with the voltage applying electrodes and grounding electrodes and arranged to electrically connect them within the same area.

FIG. 20 shows view finder images of a single-lens reflex camera. The view finder is provided with two slide type contact parts 190. Each of the contact parts 190 is arranged to measure 6 mm in length. Areas A, C and E are in a transparent state. Areas B and D are in a diffused state. An experiment was conducted with a voltage of 10 V (p-p value) applied in a rectangular wave form of 1 KHz. Then, the refractive index changed to a degree about 0.04 in the areas B and D and thus there was obtained an adequately diffused state.

In this embodiment, like the example described in the foregoing, the parts unnecessary for focusing also come to show a transparent state to facilitate observation of objects located in the rear and front areas B and D. This facilitates a focusing action. Further, the arrangement to give two diffused parts for the rear and front objects facilitate confirmation of the depth of field. Further, the control over the diffusing degree by voltage application makes it possible to attain, without reducing the light quantity of the view finder, an advantageous effect which is equivalent to confirmation of a depth of field by stopping down the lens.

Further, the movement of the liquid crystal within the non-driven part is more effectively suppressed by orienting it perpendicularly to the electrode line direction of the first group of electrodes 141a to 144a. The transparent parts, therefore, remain in high quality even when a high voltage exceeding 12 V is used for driving.

Figure 21:
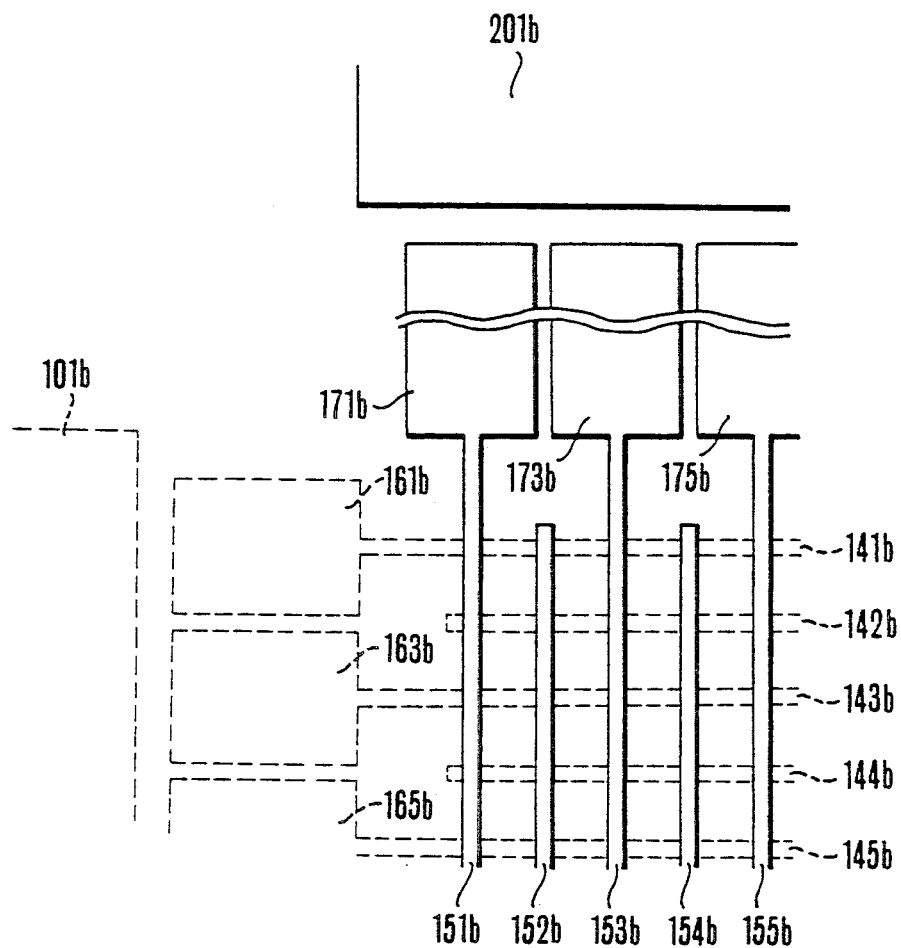
FIG. 21 is a plan view showing the essential parts of the electrode pattern of a further liquid crystal focusing screen arranged according to the invention.
Figure 22A:
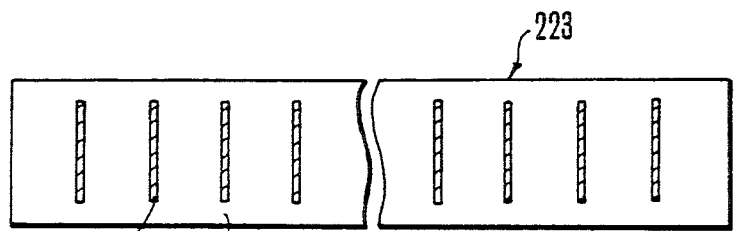
FIGS. 22(a) to 22(d) show four patterns of conductive parts of an anisotropic rectangular rubber body used for the same focusing screen.
Figure 22B:
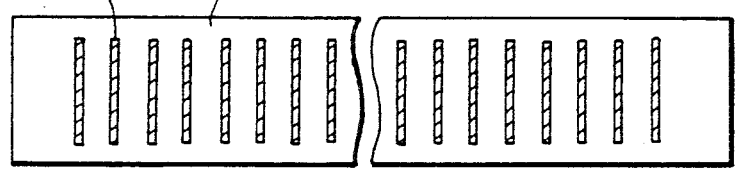
Figure 22C:
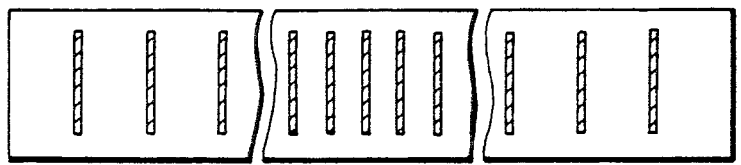
Figure 22D:
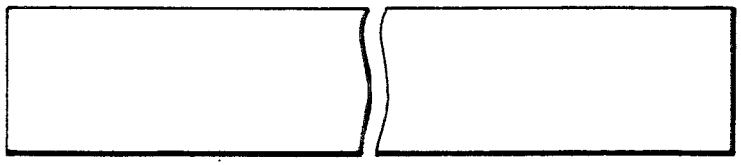
Figure 23:
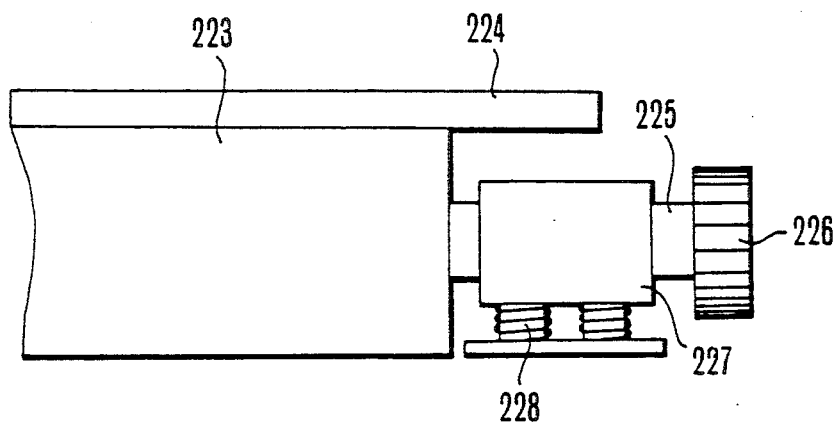
FIG. 23 is a front view showing the essential parts of a device for rotating the rectangular body.
Figure 24:
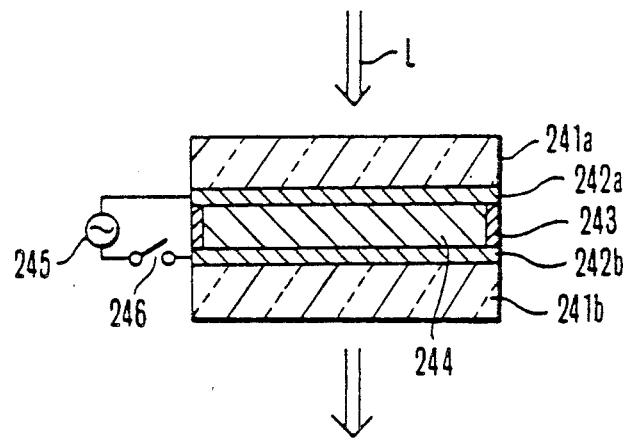
FIGS. 24 and 25 show the structural arrangement of the conventional liquid crystal cell and the quantity of transmission light in relation to a voltage applied.
Figure 25:
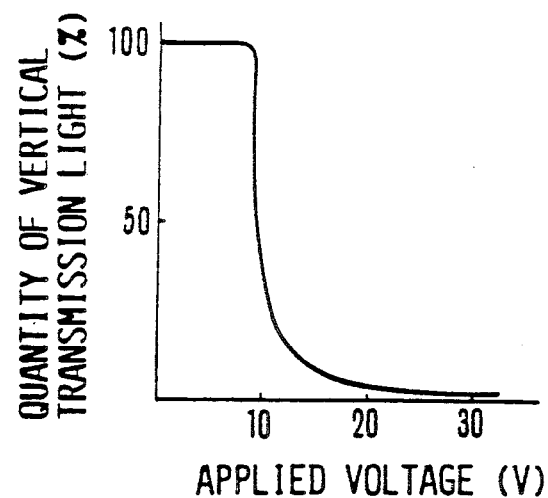
Figure 26:
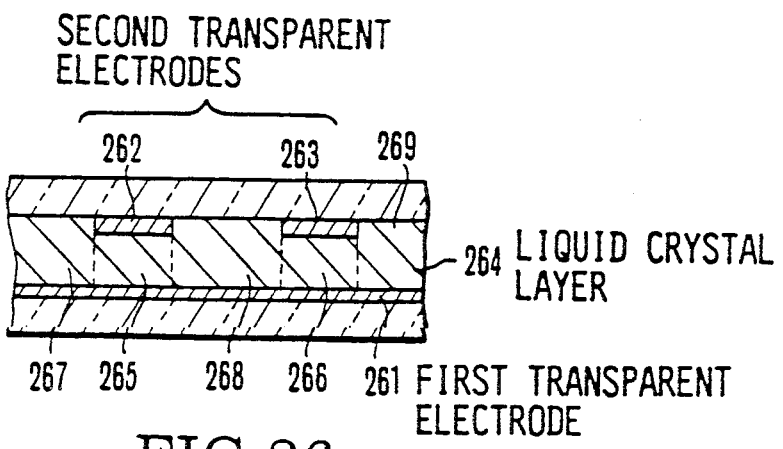
FIG. 26 is a sectional view showing an ordinary liquid crystal phase grating.
Figure 27:
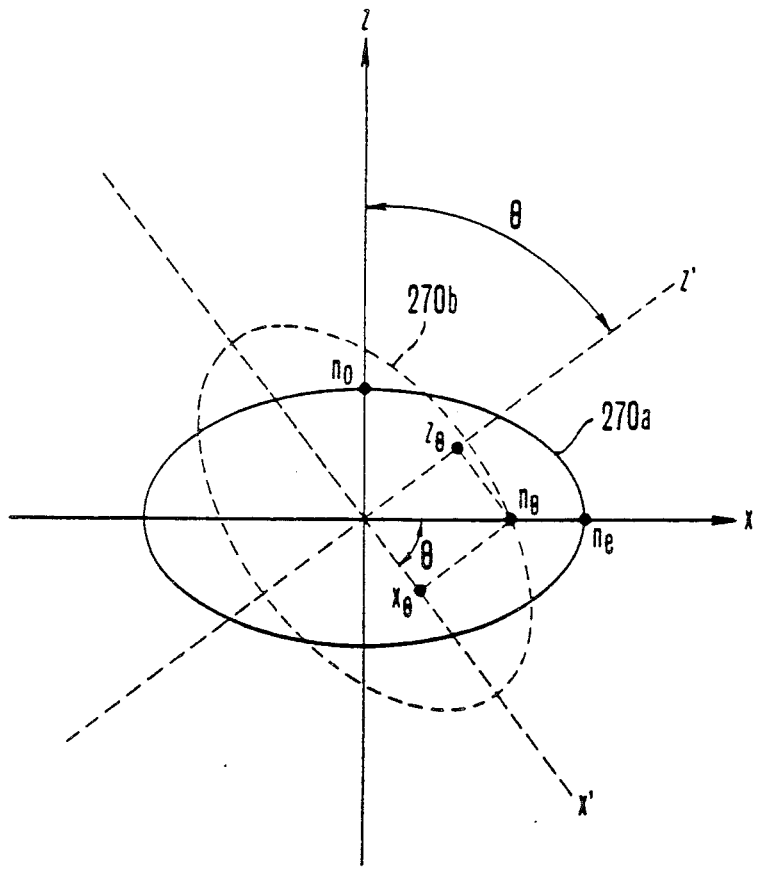
FIG. 27 shows changes in the refractive index of liquid crystals.
Figure 28:
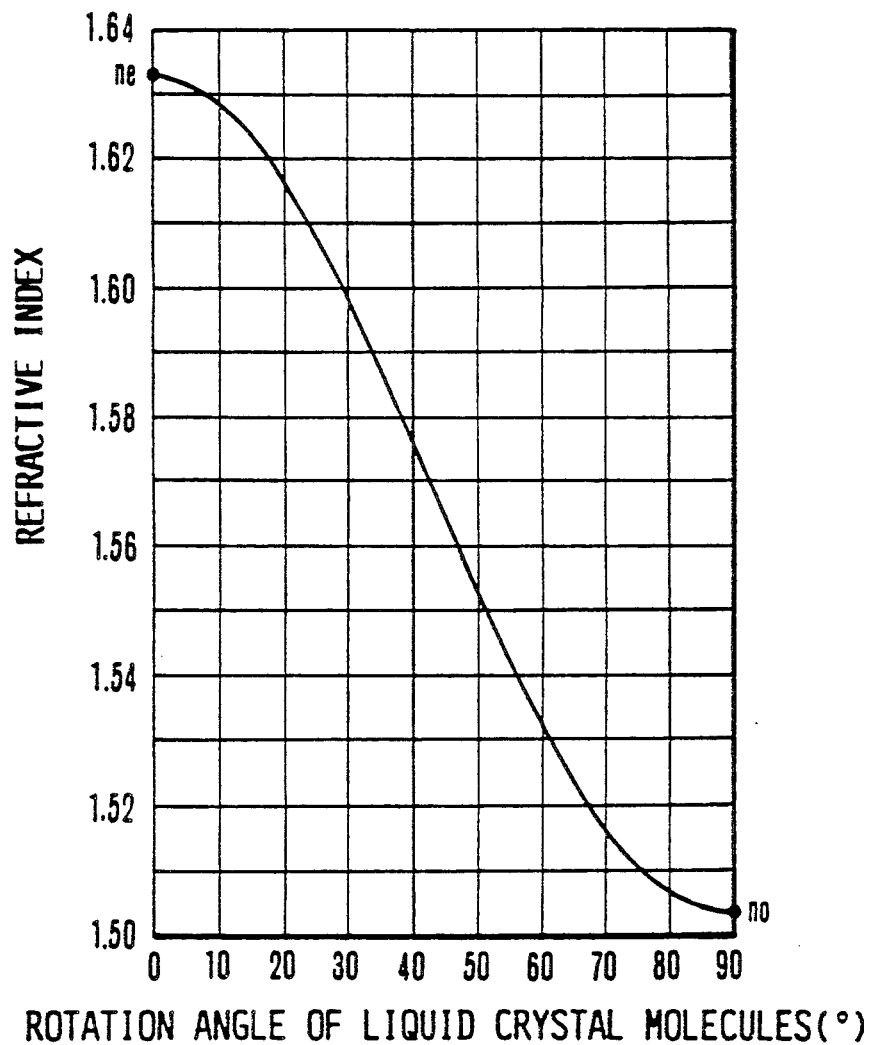
FIG. 28 is a graph showing changes taking place in the refractive index of an ordinary liquid crystal material.
Figure 29A:
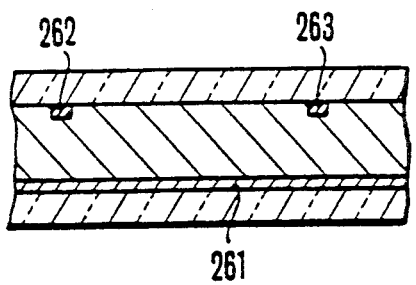
FIGS. 29(a) and 29(b) are sectional views showing the conventional liquid crystal cells.
Figure 29B:
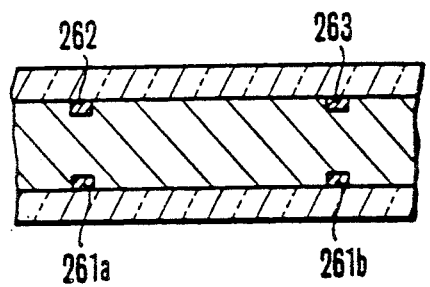
Figure 30:
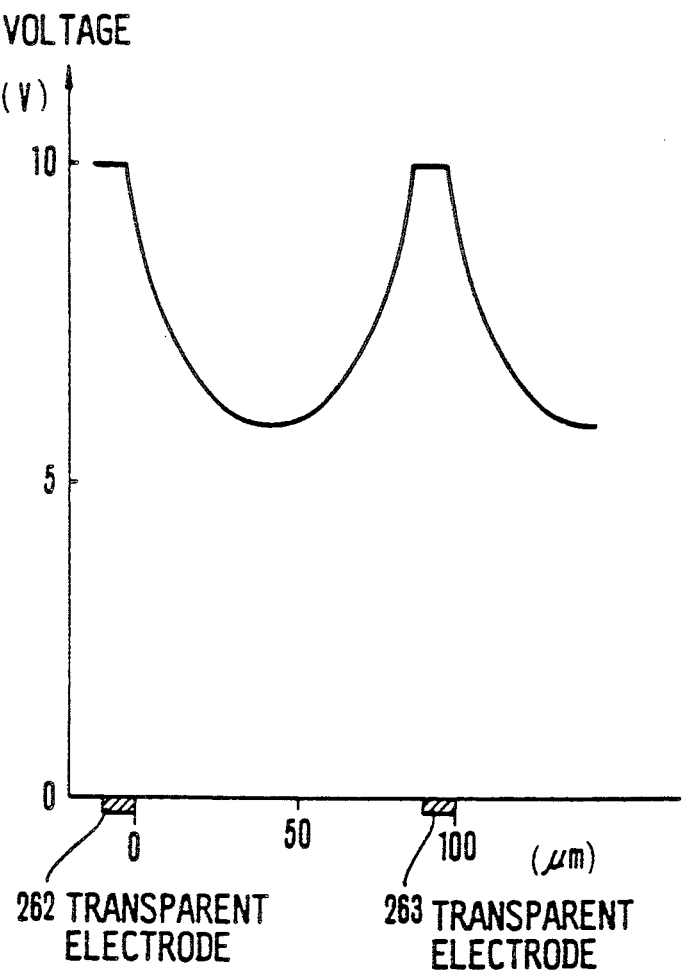
FIGS. 30 and 31 are graphs showing the voltage characteristics of the conventional cells.
Figure 31:
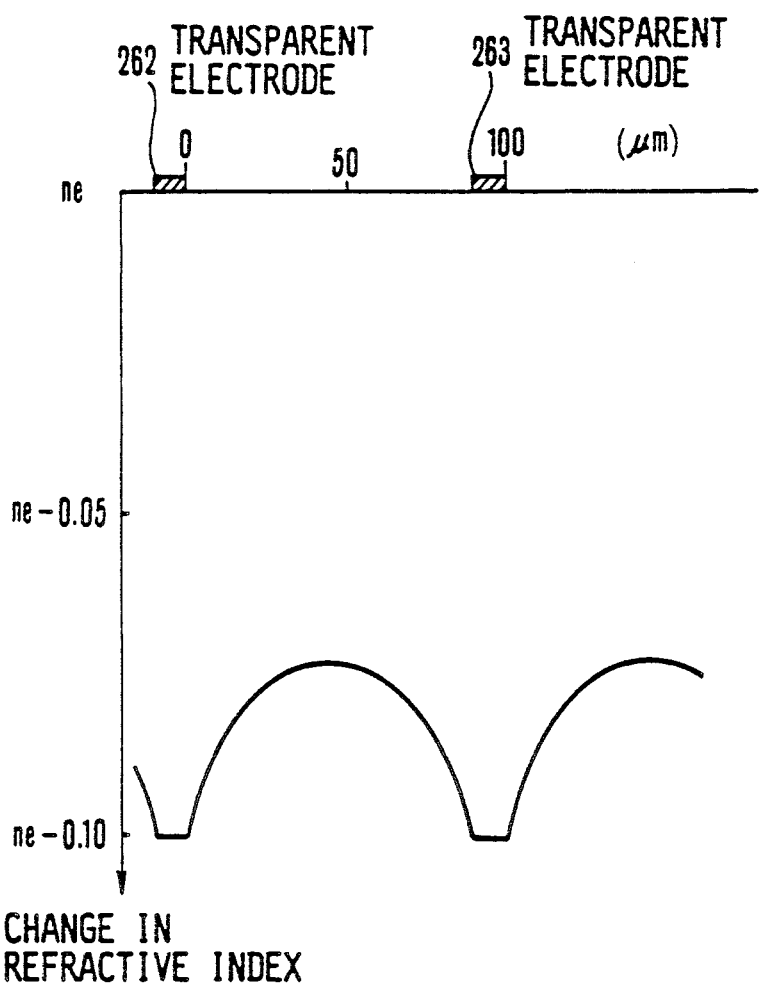
Figure 32:
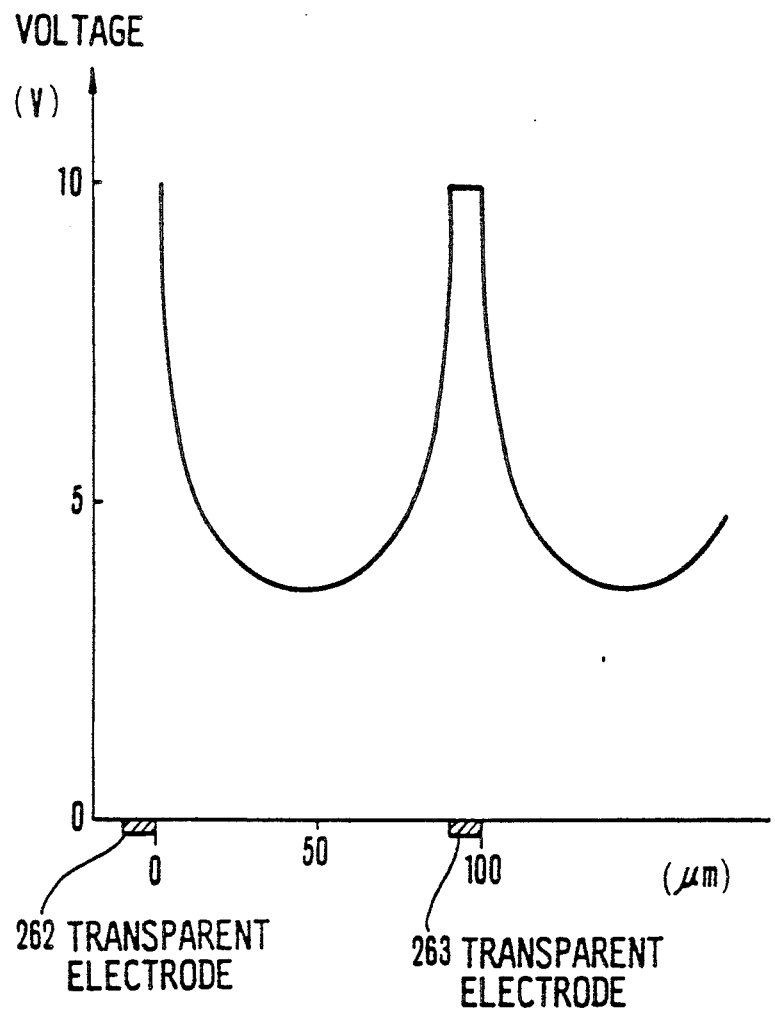
FIGS. 32 and 33 are graphs showing the distribution of refractive index obtained by the conventional cells.
Figure 33:
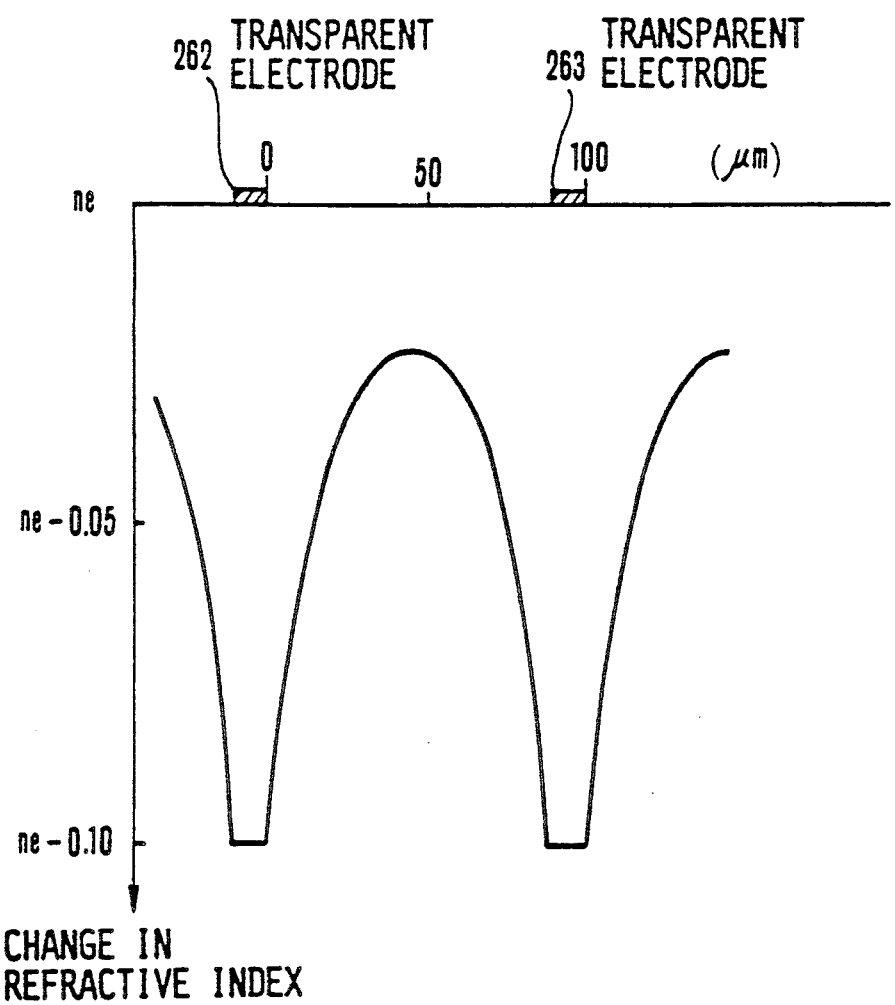

FIGS. 21 to 23 show a further embodiment of the invention. Referring to FIG. 21 which shows a part of an electrode pattern, the illustration includes a first group of electrodes 141b, 142b, 143b, 144b and 145b; a second group of electrodes 151b, 152b, 153b, 154b and 155b; leader parts 161b, 163b and 165b of the first group of electrodes 141b to 145b; leader parts 171b, 173b and 175b of the second group of electrodes 151b to 155b; and leader parts 101b and 201b which extend from a driving circuit.

Among the first and second groups of electrodes, those denoted by even numbers are grounding electrodes for zero potential. Those denoted by odd numbers are voltage applying electrodes. Among the leader electrode parts, those denoted by odd numbers are provided for voltage application. Leader electrode parts which are not shown but are provided for zero potential are connected to a ground line without being divided.

An example of this embodiment was prepared as follows: The electrode width was set at 3 μm. The spacing distance between electrodes was set at 12 μm. The width of the leader electrode parts was set at 25 μm. A nematic liquid crystal product of Roche Co. called RO-TN-2108 was employed as the liquid crystal material. The liquid crystal was oriented by the rubbing treatment of an orientation film in a direction which is at an angle of 45 degrees to each of the line-shaped electrodes and in parallel to the substrate. The thickness of the liquid crystal layer was 20 μm.

FIGS. 22(a) to 22(d) show a conductive anisotropic rubber member 223 used for connecting the leader parts of the voltage applying electrodes to the lead parts of the driving circuit. These illustrations include conductive parts 221 and insulating parts 222. The conductive anisotropic rubber member 223 is in a cuboid shape having four sides arranged as shown in FIGS. 22(a) to 22(d). The rubber member 223 is provided with a rotating device which will be described later. Each of the conductive parts 221 measures about 10 μm in width and about 2 mm in length. They are spaced at a distance of 30 μm in the peripheral parts of the rubber member 223 which are as shown in FIGS. 22(a) and 22(c) and at a distance of 15 μm in the middle part which is as shown in FIGS. 22(b) and 22(c). In a test, the leader parts of voltage applying electrodes of the first and second groups of electrodes and the lead parts of the driving circuit were electrically connected by tightly attaching them to one side face of the rubber member 223 which was as shown in FIG. 22(a). A voltage of 10 V (p-p value) was applied in a rectangular wave of 1 KHz to the embodiment under this condition. Then, the refractive index changed to a degree of about 0.04 as viewed on the focusing screen to give an adequately diffused state.

In another test, the side face arranged as shown in FIG. 22(b) was used for the electrical connection. With the test likewise conducted under that condition, about the same degree of change was obtained in the refractive index. The degree of diffusion increased in proportion to a decrease in the period of the pattern. This enabled focusing to be more accurately performed.

In a further test, the embodiment was driven with the electrical connection effected by using another side face which was arranged as shown in FIG. 22(c). As a result, the degree of diffusion was small in the peripheral parts and large in the middle part. Meanwhile, a test conducted in the same manner with the side face which was as shown FIG. 22(d) used for the electrical connection, the focusing screen became transparent.

One of the side faces shown in FIGS. 22(a) to 22(d) is selected for the electrical connection, for example, in the following manner: The side face of FIG. 22(d) which brings about a transparent state or the side face of FIG. 22(a) which brings about a small degree of diffusion is selected for an automatic focusing operation. The side face of FIG. 22(b) which gives a high degree of diffusion is selected for a manual focusing operation. The side face of FIG. 22(c) is selected when the camera has a lens which has light quantity drop to a great degree in the peripheral parts.

FIG. 23 shows a rotating device provided for turning round the above stated cuboid rubber member 223. The illustration includes the rubber member 223; a pressure plate 224 which is arranged to press the conductive anisotropic rubber against the electrodes; a shaft 225 which is provided for rotating the cuboid rubber member 223 via a gear 226; and a bearing 227 carried by a bearing base part 228 which is provided with a spring device. In changing the diffusing degree distribution, the pressure plate 224 is lifted upward to permit the cuboid rubber member 223 to be turned round as desired.

As mentioned above, the embodiment is arranged to provide the focusing screen with means for selecting the voltage applying electrodes. This arrangement enables the focusing screen to have the distribution of the diffused degree thereof changed as desired according to the photo-taking conditions. Any blurred images unnecessary for focusing can be removed from the view finder to facilitate a picture-composing or focusing operation.

It is another advantage of the embodiment that, in the event of a lens of a large F-number, the light quantity in the peripheral parts of the view finder can be prevented from decreasing without affecting focusing accuracy by lowering the diffused degree of the peripheral parts.

What is claimed is:
1. A liquid crystal device comprising:
 (a) a liquid crystal which varies its molecular orientation according to a voltage applied thereto in such a manner that the molecular orientation of the liquid crystal located between adjacent transparent electrodes formed on one of a plurality of transparent substrates is continuously varied by the applied voltage within a range between an almost horizontal direction and an almost vertical direction relative to the transparent substrates, (b) a pair of electrodes holding said liquid crystal therebetween, at least one of said pair of electrodes being patterned and divided into a plurality of electrode groups, (c) driving means for applying a plurality of voltages to said electrode groups in such a way that the liquid crystal changes its phase due to a voltage applied between the electrodes arranged on a same plane and a voltage applied between the electrodes opposing and holding the liquid crystal therebetween, and (d) designation means for designating the electrode to which the voltage is applied so as to form at least two zones having different diffusion characteristics caused by the phase change of the liquid crystal and designating a voltage to be applied to each of said electrode groups.

2. A liquid crystal device according to claim 1, wherein said plurality of electrodes arranged on the same plane are formed with a periodicity in a two-dimensional direction.

3. A liquid crystal device according to claim 2, wherein said plurality of electrodes arranged on the same plane are composed of a first electrode group forming a side portion of a polygon and a second electrode located almost at a center of the polygon.

4. A liquid crystal device according to claim 1, wherein said plurality of electrodes arranged on the same plane are formed by two first comb-shaped electrodes, the electrodes opposing and holding the liquid crystals therebetween, and having second comb-shaped electrodes arranged almost at a right angle with the two first comb-shaped electrodes and the interpole space of the first and second comb-shaped electrodes is different on the two planes.

5. A liquid crystal device according to claim 1, further comprising conductive anisotropic members having different conductivity frequency for connecting the electrodes and the driving means.

6. A method for changing the diffusion characteristics of a liquid crystal element comprising a pair of transparent substrates each having disposed therebetween a pair of transparent electrodes formed on opposite sides of a liquid crystal element, at least one of said transparent electrodes being patterned and divided into a plurality of electrode groups, said liquid crystal element enabling application of different voltages to patterned electrode groups;

said method comprising varying, by an electric field produced by an applied voltage, the molecular orientation of the liquid crystal element located between adjacent transparent electrodes among the plurality of transparent electrode groups formed on one of the transparent substrates continuously within a range between an almost horizontal direction and an almost vertical direction relative to the transparent substrates, thereby forming a periodical phase distribution according to said patterned electrode groups and producing a diffusion characteristic by simultaneously using an electric field formed in an interpolar zone on said liquid crystal element located between said opposing electrodes and a leakage electric field formed at end portions of said transparent electrodes in a non-polar zone of said liquid crystal element where said liquid crystal element is not located between said opposing electrodes.

7. A method according to claim 6, wherein said electrodes have a width of 2 $\mu$m or larger and 1/5 or less of the lattice frequency.

8. A method according to claim 6, wherein an equal voltage is applied to at least one group of the divided electrodes and to an electrode opposing said group.

* * * * *

UNITED STATES PATENT AND TRADEMARK OFFICE
CERTIFICATE OF CORRECTION

PATENT NO. : 5,136,409
DATED : August 4, 1992
INVENTOR(S) : MASAHIRO FUSHIMI ET AL.

It is certified that error appears in the above-identified patent and that said Letters Patent is hereby corrected as shown below:

On the Title page, item [56] REFERENCES CITED

U.S. Patent Documents, "Sorey" should read --Soref--.
Other Publications, "Sorey," should read --Soref,--.

COLUMN 2

Line 48, "$\dfrac{x_e^2}{n_e^2} + \dfrac{z_e^2}{n_D^2} = 1$"

should read

--$\dfrac{x_\theta^2}{n_e^2} + \dfrac{n_\theta^2}{n_o^2} = 1$--.

Line 53, "$\sin\theta = z_e/n_e$" should read --$\sin\theta = z_\theta^2/n_\theta$--.

COLUMN 9

Line 6, "formed FIG." should read --formed in a pattern of a two-dimensional period or cycle. Fig.--.

Signed and Sealed this

Thirtieth Day of November, 1993

BRUCE LEHMAN

Attest:

Attesting Officer

Commissioner of Patents and Trademarks